(12) United States Patent
Wheeler et al.

(10) Patent No.: US 12,475,493 B1
(45) Date of Patent: Nov. 18, 2025

(54) METHOD, APPARATUS, AND COMPUTER PROGRAM PRODUCT FOR SECURE FACILITATION OF PACKAGE TRANSFER

(71) Applicant: Wells Fargo Bank, N.A., San Francisco, CA (US)

(72) Inventors: Matthew N. Wheeler, Charlotte, NC (US); Carrie Anne Hanson, Charlotte, NC (US); Joseph de Bruin Tennis, Charlotte, NC (US); William J. Bailey, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 293 days.

(21) Appl. No.: 18/166,785

(22) Filed: Feb. 9, 2023

(51) Int. Cl.
G06Q 30/0601 (2023.01)
G06Q 10/0836 (2023.01)
G06Q 30/018 (2023.01)

(52) U.S. Cl.
CPC ..... G06Q 30/0609 (2013.01); G06Q 10/0836 (2013.01); G06Q 30/0185 (2013.01)

(58) Field of Classification Search
CPC .............. G06Q 30/0609; G06Q 10/0836
See application file for complete search history.

(56) References Cited

U.S. PATENT DOCUMENTS

| 9,052,992 | B2 | 6/2015 | Irwin et al. | |
|---|---|---|---|---|
| 10,482,420 | B1* | 11/2019 | Brooks | G06Q 10/0836 |
| 11,144,873 | B2 | 10/2021 | Fee et al. | |
| 11,399,649 | B2 | 8/2022 | Raphael et al. | |
| 11,526,838 | B1* | 12/2022 | Sethuraman | G06Q 10/0836 |
| 2002/0042665 | A1* | 4/2002 | Kakuta | A47G 29/141 700/214 |
| 2015/0058163 | A1* | 2/2015 | Lenahan | H04L 67/10 705/347 |
| 2016/0042415 | A1* | 2/2016 | Min | G06Q 30/0611 705/26.4 |
| 2019/0325691 | A1* | 10/2019 | Tovey | G07F 17/12 |
| 2023/0037427 | A1* | 2/2023 | Brakob | G06Q 20/208 |

OTHER PUBLICATIONS

DroParcel: Smart System for Secure Parcel Delivery: Maryam Alghfeli, Meera Alnuaimi, Nouf Alsebaiha, Shamsah Alnuaimi, Bivin Pradeep, Parag Kulkarni; College of Information Technology, United Arab Emirates University (UAEU), Al Ain UAE (Year: 2022).*

* cited by examiner

*Primary Examiner* — Jeffrey A. Smith
(74) *Attorney, Agent, or Firm* — K&L Gates LLP

(57) ABSTRACT

Systems, apparatuses, methods, and computer program products are disclosed for securely facilitating a package transfer between parties. An example method includes receiving a package offer indication and providing a control signal to a storage locker compartment of a storage locker in response to determining a package drop-off indication. The example method may further include generating a package purchase data object and determining a package sale indication associated with the package offer indication. The example method may further include providing a control signal to the storage locker compartment housing a package associated with the package offer indication in response to determining a package pick-up indication and updating the package purchase data object based on the package sale indication. The example method may further include transmitting a payment to a seller account based on the package purchase data object in response to a payment trigger event.

20 Claims, 16 Drawing Sheets

METHOD, APPARATUS, AND COMPUTER PROGRAM PRODUCT FOR SECURE FACILITATION OF PACKAGE TRANSFER

BACKGROUND

Certain online marketplaces allow for the transfer of goods between private users, which may advantageously allow for sellers to gain a financial benefit from the items and the buyer to purchase the item, often for less than the retail price. However, these types of interactions carry financial risks as well as safety concerns for both parties.

BRIEF SUMMARY

Package transfers (e.g., containing purchased items and goods) may conventionally be performed by certain authorized and equipped service providers. These conventional methods require a certain metric of trust instilled in both the buyer and seller. For example, a buyer purchasing an item from an online retailer may trust the seller (e.g., the retailer) to provide the authentic and advertised item for the advertised price. Furthermore, these conventional systems are protected by certain rules and regulations such that if a breach of contract occurs between the parties, there are avenues to rectify the issue, such as reporting a company to the Better Business Bureau, filing chargebacks in instances an unauthorized transaction was made, etc.

Online marketplaces now allow for private parties to exchange goods. However, these online marketplaces do not have the rules or regulations of the above described infrastructures, which may make it difficult for either party to agree to and pursue an exchange of goods for several reasons. One such reason is a concern for safety. For example, individuals who purchase items off social media marketplaces may wish to view the item prior to transferring funds to the seller in order to avoid scams. Similarly, sellers may wish to have the funds in hand prior to providing the items to the buyer. However, this requires individuals to meet in person, which can lead to either party being involved in a potentially dangerous situation. Indeed, this particular concern is of such importance that certain local entities have attempted to solve this issue by installing safe trade facilities equipped with crime deterrents (e.g., cameras, on-site law enforcement, etc.). While these safe trade facilities provide some level of increased safety, they still require the buyer and seller to interact with one another. And further, require the direct transfer of funds between a buyer and seller. Oftentimes, sellers request cash as this is the easiest form of payment and other payment rails may carry some risk of cancellation or require a waiting time (e.g., checks, credit cards, automated clearing house (ACH), etc.). While real time payment (RTP) networks may allow for real-time and irrevocable payments, such networks do not alleviate the need for an exchange of information between parties, such that these payment methods carry some safety and/or privacy risks.

While certain other systems allow for users to deposit and transfer items using storage lockers, these facilities are not equipped to identify and/or authenticate the users who pick-up and/or drop-off the items. As such, the facilities leave packages susceptible to theft, such as in an instance a fraudster obtains a storage locker code and/or combination.

Additionally, item fraud is another concern for transfer packages. Without sufficient identity proofing, a buyer may unwittingly purchase a counterfeit or otherwise fake item. Additionally, buyers may want to know that the item they are purchasing is authentic and/or not a stolen item. However, there is no current way to evaluate the authenticity of items or their origin prior to their sale.

Furthermore, conventional systems do not contemplate an asynchronous payment network which allows sellers to deposit a package which is currently for sale and later, once a buyer is found, allow the buyer to come pick-up the package without requiring the buyer or seller to ever meet.

In contrast to these conventional techniques, example embodiments described herein advantageously allow for the secure facilitation of package transfer between parties. In particular, example embodiments described herein allow for a seller and a buyer to securely exchange a package without physically meeting. In particular, example embodiments provided herein may employ identity proofing techniques that authenticate drop-off users who are dropping off a package and pick-up users who are picking up a package and only in instances whether the respective user is authenticated, does the storage locker compartment unlock and open for the user. As such, techniques described herein allow for a package to be securely transferred only between authenticated parties, thus preventing fraudsters from stealing the package.

Additionally, example embodiments described herein allow for the evaluation of a package and/or package contents prior to allowing the package to be stored in the storage lockers. Facility devices may be used to capture one or more package attributes, which may be evaluated to generate a package identity confidence score, which is indicative of an inferred confidence that the package and/or package contents are authentic to the package and/or package contents as claimed by the seller. The package and/or package contents may also be evaluated to determine whether they are associated with a stolen item. Advantageously, this allows buyers to purchase a package with confidence that the package and/or package contents are authentic.

Furthermore, example embodiments may allow for the secure and anonymous transfer of funds from the buyer to the seller without either party needing information from the other. In particular, a seller may provide his/her account details using package offer indication and a buyer may provide his/her account details using a buyer identity indication. As such, the buyer and seller may not exchange personal information and/or details other than a package identifier to link the buyer and seller information. In instances where the buyer and seller are known to one another and are trusted, the package offer indication may include buyer details.

Additionally, in some embodiments, the seller may apply to be enrolled in an immediately accessible funds program. The immediately accessible funds program may advantageously provide the seller with immediate payment upon deposit of the package in the storage locker compartment of the storage locker using an intermediary account. Upon successful sale and pick-up of the package by the buyer, the funds from the buyer may then be transferred to the intermediary account.

In some example embodiments, the techniques described herein relate to a method for securely facilitating a package transfer between parties. The method includes receiving, by communications hardware, a package offer indication, wherein the package offer indication comprises a package identifier and a user identifier associated with a seller and providing, by storage locker circuitry and in response to receiving a package drop-off indication, a control signal to a storage locker compartment of a storage locker, wherein the control signal causes the storage locker compartment to unlock. The method further includes generating, by payment circuitry, a package purchase data object based on the package offer indication and determining, by the payment circuitry, a package sale indication associated with the package offer indication, wherein the package sale indication comprises a package purchase price and a user identifier associated with a buyer. The method further includes providing, by the storage locker circuitry and in response to receiving a package pick-up indication, a control signal to the storage locker compartment, wherein the control signal causes the storage locker compartment to unlock and updating, by the payment circuitry, the package purchase data object based on the package sale indication. The method further includes transmitting, by the payment circuitry and in response to a payment trigger event, a payment to a seller account based on the package purchase data object.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
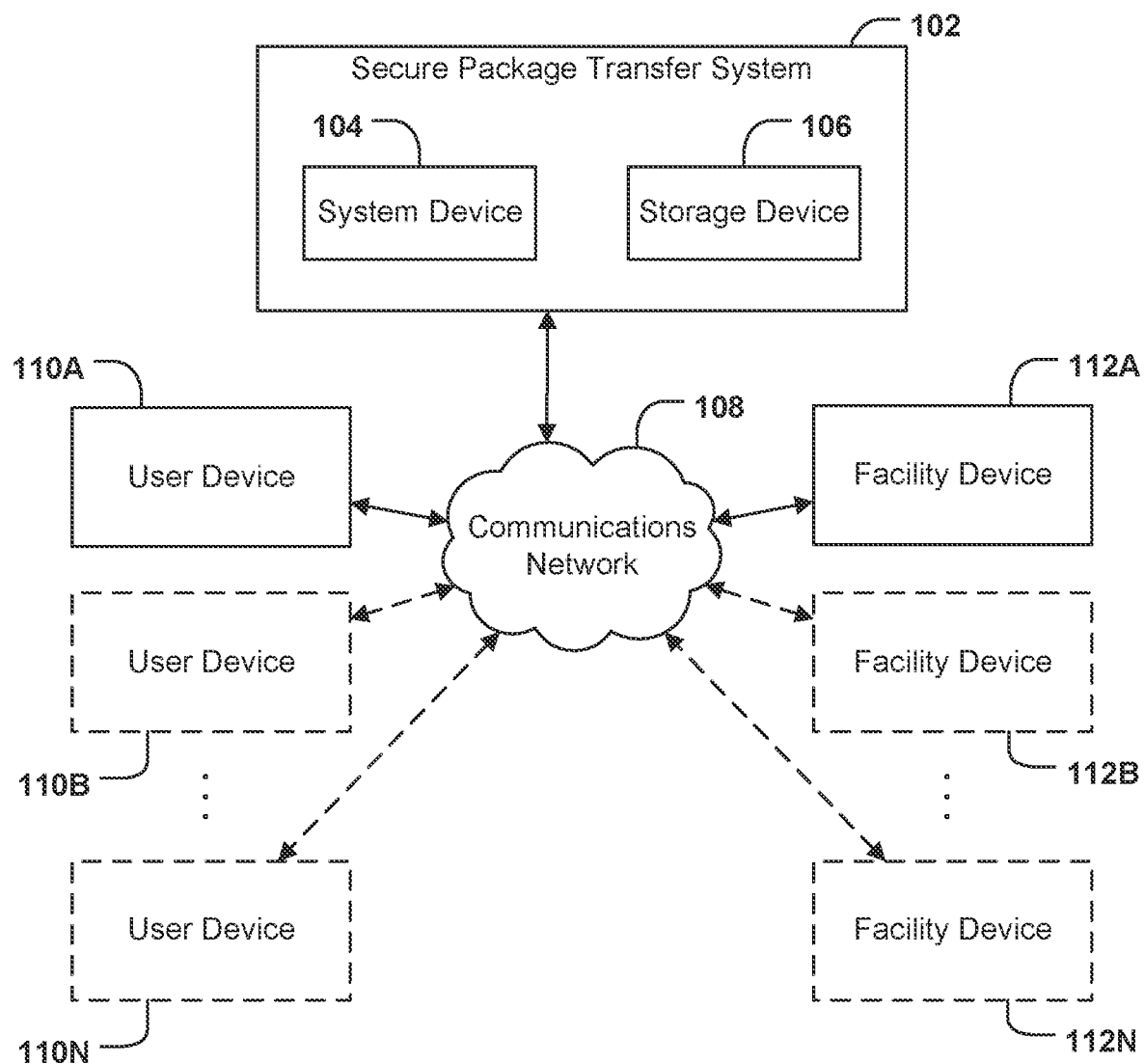
FIG. 1 illustrates a system in which some example embodiments may be used for securely facilitating a package transfer between parties, in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Definition of Certain Terms

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "package" may be used to refer to one or more physical items that are offered for sale by a seller. In some embodiments, a package may refer to one or more containers containing one or more items that are offered for sale by the seller. A package may be associated with a package identifier which uniquely identifies the package from other packages. The package identifier may be generated by the device associated with generating the package offer indication. A package may be associated with one or more package attributes that describe the package and/or package contents. Package attributes may include package dimensions (e.g., height, length, width, radius, diameter, etc.), shape, weight, color, indicia, item identifiers (e.g., barcodes, international mobile equipment identity (IMEI, serial numbers, etc.), and/or the like. In some embodiments, the one or more package attributes may be captured by a facility device and/or may be provided by the seller, such as in the package offer indication. The one or more package attributes may also describe a package sale price and/or package purchase price. The package sale price may refer to the monetary amount for which the package is offered for sale. The package purchase price may refer to the monetary amount for which the package is sold for. The one or more package attributes may also be associated with one or more package sale price conditions that control and/or regulate the amount the package may be purchased for and/or the current package sale price. The package sale price conditions may control an amount of deviation from a previous package sale price (e.g., an amount or percentage of the previous package sale price to increase or decrease by) and/or timing thresholds (e.g., when to modify a package sale price).

The term "seller" may be used to refer to an individual offering a package for sale. In some embodiments, a seller may be associated with a particular user identifier. Additionally, the seller may be associated with one or more user parameters associated with a seller described by the user identifier. A user identifier may uniquely identify the seller from one or more other individuals. A user identifier may be username, phone number, email address, driver's license number, permanent resident card number, social security number, passport number, and/or the like. User parameters may refer to data relevant to the seller (e.g., financial account data, user biometric data, user passwords/passcodes, user device data, phone numbers, email addresses, residential addresses, criminal record, or the like). In some embodiments, the user identifier may be used to query an associated memory and/or information databases to determine the one or more user parameters associated with the user identifier. In some embodiments, the user identifier may be associated with a user profile stored in an associated memory, which may include one or more user parameters. If the user identifier is determined not to be associated with an existing user profile, a user profile may be generated for the seller and the one or more queried or otherwise determine user parameters may be stored in the corresponding user profile.

The term "buyer" may be used to refer to an individual who purchased the offered package. In some embodiments, a buyer may be associated with a particular user identifier. Additionally, the buyer may be associated with one or more user parameters associated with a buyer described by the user identifier. A user identifier may uniquely identify the buyer from one or more other individuals. A user identifier may be username, phone number, email address, driver's license number, permanent resident card number, social security number, passport number, and/or the like. User parameters may refer to data relevant to the buyer (e.g., financial account data, user biometric data, user passwords/passcodes, user device data, phone numbers, email addresses, residential addresses, criminal record, or the like). In some embodiments, the user identifier may be used to query an associated memory and/or information databases to determine the one or more user parameters associated with the user identifier. In some embodiments, the user identifier may be associated with a user profile stored in an associated memory, which may include one or more user parameters. If the user identifier is determined not to be associated with an existing user profile, a user profile may be generated for the buyer and the one or more queried or otherwise determine user parameters may be stored in the corresponding user profile.

The term "package offer indication" may be used to refer to a data construct configured to describe a package that is offered for sale by a seller described by a corresponding user identifier. The package offer indication may indicate that the seller wishes to store the package at an associated facility either now or in the future. The package offer indication may include one or more package attributes, a package identifier, and a user identifier associated with the seller. In some embodiments, the package offer indication may also include one or more user parameters for the seller described by the user identifier. In some embodiments, the package offer indication may also include a drop-off user identifier, where the drop-off user identifier is indicative of a user identifier of an individual who is authorized to drop-off the package at the storage locker of a facility (e.g., the seller or another authorized individual). In some embodiments, the package offer indication may also include a user identifier associated with a buyer and a package purchase price, such as in instances where the package has already been sold. In some embodiments, the package offer indication may also include one or more user parameters for the buyer described by the user identifier. In some embodiments, the package offer indication may further include an indication as to whether the seller would like to opt-in to an immediately accessible funds program, which may be offered to select sellers. Sellers who select to opt-in to the immediately accessible funds program may be evaluated to determine whether they fit the program criteria, such as by a user eligibility model, and in an instance the seller satisfies the program criteria, the seller may automatically be enrolled in the immediately accessible funds program. The immediately accessible funds program may allow for funds from an intermediary account to be transferred to a seller account upon deposit of the package. The amount of funds received from the intermediary account may be based on the current package sale price and/or one or more associated fees for enrolling in the program.

The term "user drop-off request" may be used to refer to a data construct configured to describe a request for authentication of a candidate user to drop-off a package. The user drop-off request may be received once a candidate drop-off user is within the facility and is attempting to drop-off a package. The user drop-off request may include candidate drop-off user data for a candidate drop-off user. Candidate drop-off user data may include a user identifier for the user attempting to drop-off the package as well as one or more captured user parameters, such as one or more captured images depicting the candidate drop-off user, one or more biometric scans of the candidate drop-off user, and/or one or more other authentication credentials (e.g., usernames, passwords/passcodes, etc.). In some embodiments, the user drop-off request further includes or more package attributes captured for the package to be dropped-off by the candidate drop-off user. The candidate drop-off user data may be used, such as by a user authentication model, to authenticate a candidate drop-off user. Additionally or alternatively, the one or more package attributes may be used to determine a package identity confidence score for the package.

The term "package drop-off indication" may be used to refer to data construct configured to describe a package drop-off event at a facility in response to a candidate drop-off user being authenticated and/or the package being authenticated. The package drop-off indication may describe the candidate drop-off user data, an associated user authentication score for the candidate drop-off user, the one or more package attributes for the package, an associated package identity score threshold for the package, a package drop-off time, a package drop-off date, a package storage location, and/or the like. The package drop-off indication may trigger a control signal to be provided to a particular storage locker compartment of a storage locker of a facility, which causes the storage locker compartment to unlock and/or open such that the package may be placed in the storage locker compartment. In some embodiments, the package drop-off indication may further include a package identifier. The package identifier may be provided to a user device of the seller, buyer, and/or a pick-up user such a pick-up user may use the package identifier to quickly identify the package and storage compartment he/she is there to pick-up.

The term "package sale indication" may be used to refer to a data construct configured to describe a package has been purchased by a buyer described by a corresponding user identifier. The package sale indication may indicate that the buyer wishes to pick-up the package either now or in the future. The package sale indication may include the package identifier and a user identifier associated with the buyer. In some embodiments, the package sale indication may also include one or more user parameters for the buyer described by the user identifier. In some embodiments, the package sale indication may also include a pick-up user identifier, where the pick-up user identifier is indicative of a user identifier of an individual who is authorized to pick-up the package at the storage locker of a facility (e.g., the buyer or another authorized individual). The package sale indication may also include a package purchase price.

The term "user pick-up request" may be used to refer to a data construct configured to describe a request for authentication of a candidate user to pick-up a package. The user pick-up request may be received once a candidate pick-up user is within the facility and is attempting to pick-up a package from the storage locker compartment. The user pick-up request may include candidate pick-up user data for a candidate pick-up user. Candidate pick-up user data may include a user identifier for the user attempting to pick-up the package as well as one or more captured user parameters, such as one or more captured images depicting the candidate pick-up user, one or more biometric scans of the candidate pick-up user, and/or one or more other authentication credentials (e.g., usernames, passwords/passcodes, etc.). The candidate pick-up user data may be used, such as by a user authentication model, to authenticate a candidate pick-up user.

The term "package pick-up indication" may be used to refer to data construct configured to describe a package pick-up event at a facility in response to a candidate pick-up user being authenticated. The package pick-up indication may describe the candidate pick-up user data, an associated user authentication score for the candidate pick-up user, a package pick-up time, a package pick-up date, a package storage location, and/or the like. The package pick-up indication may trigger a control signal to be provided to the particular storage locker compartment of a storage locker storing the package, which causes the storage locker compartment to unlock and/or open such that the package may be removed from the storage locker compartment.

The term "package purchase data object" may be used to refer to data construct configured describe data relating to the purchase of a package. The package purchase data object may include the seller identifier and a destination account which may receive the funds from the purchase of the package. The package purchase data object may also include the package purchase price (e.g., in the event the package is sold) and/or one or more package sale prices. The package purchase data object may further include the buyer identifier and a withdrawal account from which funds may be withdrawn from to fund the purchase of the package. In some embodiments, in the instance the seller is enrolled in the immediately accessible funds program the package purchase data object may further include an intermediary account, from which funds may be withdrawn to fund the seller account upon deposit of the package and to which funds may be deposited as received from a buyer account upon collection of the package. The package purchase data object may be generated and updated as information becomes available.

The term "payment trigger event" may be used to refer to a data construct configured to describe an event which causes funds to be transferred from one account to another. In some embodiments, the payment trigger event is performed based on the package purchase data object, which may indicate a package purchase price, a destination account, and a withdrawal account. In some embodiments, a payment trigger event may be triggered in response to a package removal detection alert. A package removal detection alert may be received in the instance a package is removed from a storage compartment (e.g., as detected by a scale within the storage locker compartment, cameras, and/or other devices). In some embodiments, the payment trigger event is in response to a package removal detection alert may cause the funds to be transferred from a withdrawal account associated with the buyer to a destination account associated with the seller. In an instance the seller has opted into the immediately accessible funds program, the trigger event is determined in response to a package removal detection alert, which may cause the funds to be transferred from an intermediary account to a destination account associated with the seller. In some embodiments, a payment trigger event may be triggered in response to a package placement detection alert. A package placement detection alert may be received in the instance a package is placed into a storage compartment (e.g., as detected by a scale within the storage locker compartment, cameras, and/or other devices). In an instance the seller has opted into the immediately accessible funds program and is successfully enrolled, the payment trigger event is determined in response to a package placement detection alert, which may cause the funds to be transferred from a withdrawal account associated with the buyer to the intermediary account.

The term "user eligibility model" may refer to a data construct that is configured to describe parameters, hyperparameters, and/or stored operations of a model that is configured to process a package offer indication which indicates a seller would like to enroll in the immediately accessible funds program and generate a user eligibility outcome for the seller. The user eligibility model may be a rules-based model (e.g., a tree-based model) configured to follow a defined set of rules and/or operations to determine whether a user is eligible for the immediately accessible funds program. The user eligibility model may process the package offer indication to determine one or more user parameters and/or a user identifier associated with the seller. In some embodiments, the user eligibility model may query an associated memory and/or databases to determine one or more user parameters using the user identifier associated with the seller. The user eligibility model may then process the one or more user parameters to determine whether the one or more user parameters satisfy the one or more eligibility program criteria. For example, the one or more eligibility program criteria may require the seller to have no instances of fraud associated with his/her account as indicated by the one or more user parameters. In an instance the one or more user parameters fail to satisfy the one or more eligibility program criteria, the user eligibility model may determine the seller is not eligible. The user eligibility outcome may be a binary output indicative of whether the user is eligible for the immediately accessible funds program. For example, the user eligibility outcome may be categorical where the two possible user eligibility outcome categories are "eligible" and "not eligible". As another example, the user eligibility outcome may be numerical where the values are binary and are indicative of whether the user is eligible (e.g., 1) or not eligible (e.g., 0).

The term "user authentication model" may refer to a data construct that is configured to describe parameters, hyper-parameters, and/or stored operations of a model that is configured to process one or more user parameters (e.g., pertaining to a candidate pick-up user and/or candidate drop-off user), perform one or more authentication operations, and generate a user authentication outcome for the corresponding user. Additionally, the user authentication model may be configured to determine whether a candidate drop-off user and/or candidate pick-up user is associated with permission to perform the drop-off or pick-up activity, respectively. In some embodiments, the user authentication model may be a trained machine learning model, such as a neural network. Alternatively, the user authentication model may be a rules-based model (e.g., a tree-based model) configured to follow a defined set of rules and/or operations to determine whether a user is authenticated. In some embodiments, the user authentication model may be configured to generate a user identification confidence score that describes a numerical value which provides a determined measure of confidence that the candidate user is the user they are claiming to be. The user authentication model may be configured to determine a user identification confidence score for a captured user parameter based on comparison of the values described by the captured user parameter to one or more corresponding values for stored user parameters stored in a user profile associated with the corresponding user identifier. The user profile may store previously collected data from the particular user that allow various systems to authenticate the user (such as data from or derived from biometrics, images, audio, user device data, passwords, or the like). In some embodiments, the user authentication model may generate the user authentication outcome based on the user identification confidence score and/or one or more user identification confidence score thresholds. The user authentication outcome may be a binary output indicative of whether the user is authenticated. For example, the user authentication outcome may be categorical where the two possible user authentication outcome categories are "authenticated" and "not authenticated". As another example, the user authentication outcome may be numerical where the values are binary and are indicative of whether the user is authenticated (e.g., 1) or not authenticated (e.g., 0).

In some embodiments, the user authentication model may determine whether a value of a captured user parameter is an exact match to a stored user parameter such that the user identification confidence score for the captured user parameter is binary (e.g., match/non-match, 0/1, etc.). In some embodiments, the user authentication model may employ any suitable algorithm to process the captured user parameters (e.g., principal component analysis, linear discriminant analysis, etc.), such as for biometric analyses. In some embodiments, the user authentication model may employ any suitable clustering algorithms including but not limited to affinity propagation, agglomerative clustering, balanced iterative reducing and clustering using hierarchies (BIRCH), density-based spatial clustering of applications with noise (DBSCAN), k-means, mini-batch k-means, mean shift, ordering points to identify cluster structure (OPTICS), spectral clustering, mixture of Gaussians, and/or the like. In some embodiments, the user authentication model may cluster one or more captured user parameters with one or more stored user parameters. In some embodiments, the user identification confidence score may be determined based on an inter-cluster distance between two or more clusters for a particular captured user parameter.

The term "package authentication model" may be used to refer to a data construct that is configured to describe parameters, hyper-parameters, and/or stored operations of a model that is configured to process one or more package attributes described by the package offer indication and captured by a facility device to generate a package identity confidence score for the package. In some embodiments, the package authentication model may be a trained machine learning model, such as a neural network. Alternatively, the package authentication model may be a rules-based model (e.g., a tree-based model) configured to follow a defined set of rules and/or operations to determine a package identity confidence score. The package authentication model may be configured to compare the package attributes as provided by the package offer indication to similar values captured by the facility device to determine an attribute similarity score for each package attribute. Additionally, the package authentication model may be configured to query one or more external repositories and/or databases for attribute values to compare the captured package attributes to in order to ensure the package and/or package contents are authentic. In some embodiments, the package authentication model may further be configured to perform one or more security checks, which may include performing a search using the one or more captured package attributes to ensure the package and/or package content is not associated with a stolen item. The package authentication model may generate the package identity confidence score based on the number of package attribute matches and the results of the one or more security checks. The package identity confidence score may be a numeric value within a predetermined range of values that is indicative of the inferred confidence that the package and/or package contents are authentic as claimed by the seller.

System Architecture

Example embodiments described herein may be implemented using any of a variety of computing devices or servers. To this end, FIG. 1 illustrates an example environment within which various embodiments may operate. As illustrated, a secure package transfer system 102 may include a system device 104 in communication with a storage device 106. Although system device 104 and storage device 106 are described in singular form, some embodiments may utilize more than one system device 104 and/or more than one storage device 106. Additionally, some embodiments of the secure package transfer system 102 may not require a storage device 106 at all. Whatever the implementation, the secure package transfer system 102, and its constituent system device(s) 104 and/or storage device(s) 106 may receive and/or transmit information via communications network 108 (e.g., the Internet) with any number of other devices, such as one or more of user device 110A, user device 110B, through user device 110N and/or facility device 112A, facility device 112B, through facility device 112N.

System device 104 may be implemented as one or more servers, which may or may not be physically proximate to other components of secure package transfer system 102. Furthermore, some components of system device 104 may be physically proximate to the other components of secure package transfer system 102 while other components are not. System device 104 may receive, process, generate, and transmit data, signals, and electronic information to facilitate the operations of the secure package transfer system 102.

Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the secure package transfer system 102. Storage device 106 may store information relied upon during operation of the secure package transfer system 102, such as various stored user data that may be used by the secure package transfer system 102, data and documents to be analyzed using the secure package transfer system 102, or the like. In addition, storage device 106 may store control signals, device characteristics, and access credentials enabling interaction between the secure package transfer system 102 and one or more of the user devices 110A-110N or facility devices 112A-112N.

The one or more user devices 110A-110N may be embodied by any storage devices known in the art, such as desktop or laptop computers, tablet devices, smartphones, or the like. Similarly, the one or more facility devices 112A-112N may be embodied by any computing devices known in the art, such as a smart storage locker configured with a plurality of storage locker compartments, interactive kiosks, desktop or laptop computers, tablet devices, smartphones, or the like. The one or more user devices 110A-110N and the one or more facility devices 112A-112N need not themselves be independent devices, but may be peripheral devices communicatively coupled to other computing devices. In some embodiments, the one or more facility devices 112A-112N may be connected with one another and/or secure package transfer system 102 via a secure intranet.

Although FIG. 1 illustrates an environment and implementation in which the secure package transfer system 102 interacts with one or more of user device 110A, user device 110B, through user device 110N and/or facility device 112A, facility device 112B, through facility device 112N, in some embodiments users may directly interact with the secure package transfer system 102 (e.g., via input/output circuitry of system device 104), in which case a separate facility device 112A-112N may not be utilized. Whether by way of direct interaction or via a separate facility device 112A-112N, a user may communicate with, operate, control, modify, or otherwise interact with the secure package transfer system 102 to perform the various functions and achieve the various benefits described herein.

Example Implementing Apparatuses

Figure 2:
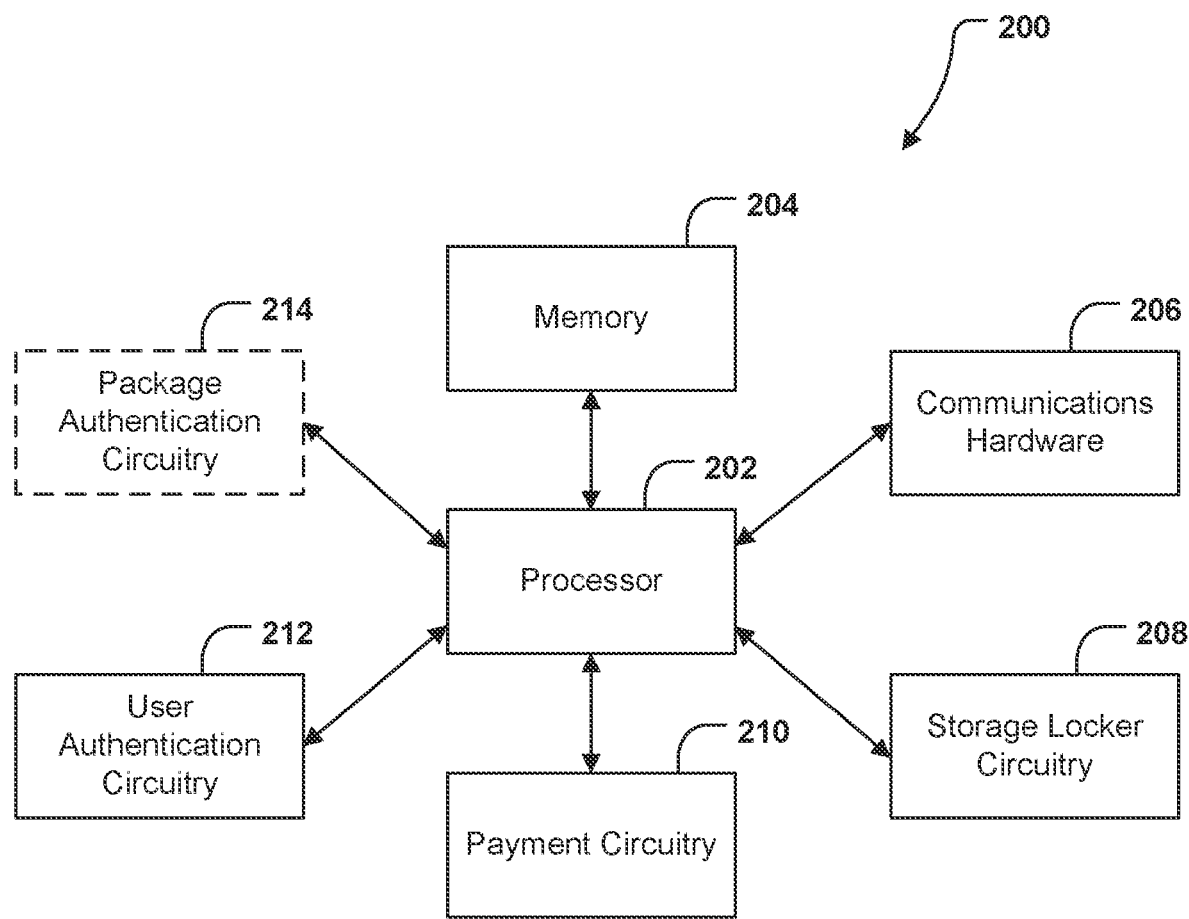
FIG. 2 illustrates a schematic block diagram of example circuitry embodying a system device that may perform various operations in accordance with some example embodiments described herein.

System device 104 of the secure package transfer system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, storage locker circuitry 208, payment circuitry 210, user authentication circuitry 212, package authentication circuitry 214, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 4A-12.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 may further comprises a storage locker circuitry 208 that is configured to provide a control signal to a storage locker and/or storage locker compartments. A control signal may cause one or more storage compartments of a storage locker to unlock and/or open. A control signal may also cause one or more storage compartments of a storage locker to close and/or lock. In some embodiments, the storage locker circuitry 208 may further be configured to select a storage locker compartment based on one or more package attributes. The storage locker circuitry 208 may utilize processor 202, memory 204, or any other hardware component included in the apparatus 200 to perform these operations, as described in connection with FIGS. 4A-12 below. The storage locker circuitry 208 may further utilize communications hardware 206 to gather data from a variety of sources (e.g., user device 110A through user device 110N, facility device 112A through facility device 112N, or storage device 106, as shown in FIG. 1), and/or exchange data with a user, and in some embodiments may utilize processor 202 and/or memory 204 to perform the above described actions.

In addition, the apparatus 200 may further comprises payment circuitry 210 that is configured to generate a package purchase data object. In some embodiments, the payment circuitry 210 may determine a package sale indication, update the package purchase data object, and/or transmit one or more payments (e.g., in response to one or more payment trigger events). The payment circuitry 210 may utilize processor 202, memory 204, or any other hardware component included in the apparatus 200 to perform these operations, as described in connection with FIGS. 4A-12 below. The payment circuitry 210 may further utilize communications hardware 206 to gather data from a variety of sources (e.g., user device 110A through user device 110N, facility device 112A through facility device 112N, or storage device 106, as shown in FIG. 1), and/or exchange data with a user, and in some embodiments may utilize processor 202 and/or memory 204 to perform the above described actions.

In addition, the apparatus 200 may further comprises user authentication circuitry 212 that is configured to perform one or more authentication operations. In some embodiments, user authentication circuitry 212 performs one or more authentication operations to determine whether a candidate drop-off user is authenticated and/or whether a candidate pick-up user is authenticated. In some embodiments, the user authentication circuitry 212 is further configured to cause a package drop-off indication in an instance a candidate drop-off user is authenticated and/or cause a package pick-up indication in an instance a candidate pick-up user is authenticated. The user authentication circuitry 212 may utilize processor 202, memory 204, or any other hardware component included in the apparatus 200 to perform these operations, as described in connection with FIGS. 4A-12 below. The user authentication circuitry 212 may further utilize communications hardware 206 to gather data from a variety of sources (e.g., user device 110A through user device 110N, facility device 112A through facility device 112N, or storage device 106, as shown in FIG. 1), and/or exchange data with a user, and in some embodiments may utilize processor 202 and/or memory 204 to perform the above described actions.

In addition, the apparatus 200 may further comprises package authentication circuitry 214 that is configured to determine a package identity confidence score for a package and determine whether a package satisfies one or more package identity confidence score thresholds. The package authentication circuitry 214 may utilize processor 202, memory 204, or any other hardware component included in the apparatus 200 to perform these operations, as described in connection with FIGS. 4A-12 below. The package authentication circuitry 214 may further utilize communications hardware 206 to gather data from a variety of sources (e.g., user device 110A through user device 110N, facility device 112A through facility device 112N, or storage device 106, as shown in FIG. 1), and/or exchange data with a user, and in some embodiments may utilize processor 202 and/or memory 204 to perform the above described actions.

Although components 202-214 are described in part using functional language, it will be understood that the particular implementations necessarily include the use of particular hardware. It should also be understood that certain of these components 202-214 may include similar or common hardware. For example, the storage locker circuitry 208, payment circuitry 210, user authentication circuitry 212, and package authentication circuitry 214 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the storage locker circuitry 208, payment circuitry 210, user authentication circuitry 212, and package authentication circuitry 214 may leverage processor 202, memory 204, or communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the storage locker circuitry 208, payment circuitry 210, user authentication circuitry 212, and package authentication circuitry 214 are implemented via particular machinery designed for performing the functions described herein in connection with such elements of apparatus 200.

Figure 3:
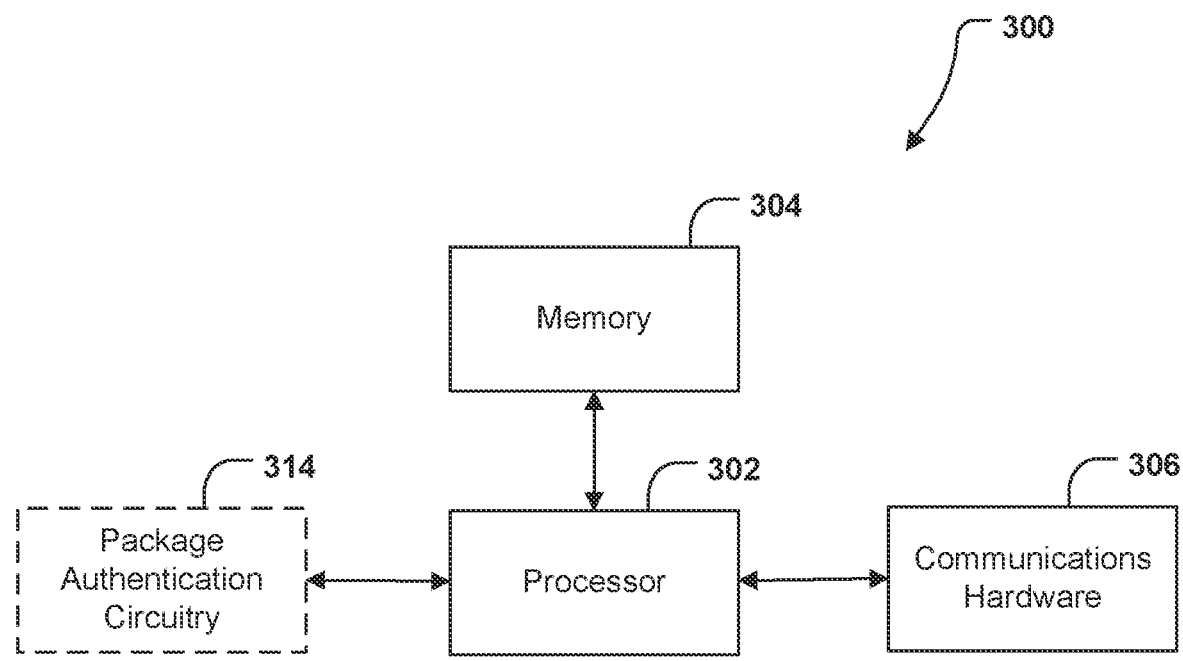
FIG. 3 illustrates a schematic block diagram of example circuitry embodying a user device and/or facility device that may perform various operations in accordance with some example embodiments described herein.

As illustrated in FIG. 3, an apparatus 300 is shown that represents an example user device (e.g., any of user device 110A through user device 110N) or an example facility device (e.g., any of facility device 112A through facility device 112N). The apparatus 300 includes processing circuitry 302, memory 304, and communications hardware 306, and may optionally include package authentication circuitry 314, each of which is configured to be similar to the similarly named components described above in connection with FIG. 2.

In some embodiments, various components of the apparatuses 200 and 300 may be hosted remotely (e.g., by one or more cloud servers) and thus need not physically reside on the corresponding apparatus 200 or 300. Thus, some or all of the functionality described herein may be provided by third party circuitry. For example, a given apparatus 200 or 300 may access one or more third party circuitries via any sort of networked connection that facilitates transmission of data and electronic information between the apparatus 200 or 300 and the third party circuitries. In turn, that apparatus 200 or 300 may be in remote communication with one or more of the other components describe above as comprising the apparatus 200 or 300.

As will be appreciated based on this disclosure, example embodiments contemplated herein may be implemented by an apparatus 200 or 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatuses 200 and 300, example embodiments are described below in connection with a series of graphical user interfaces and flowcharts.

Example Operations

Figure 4A:
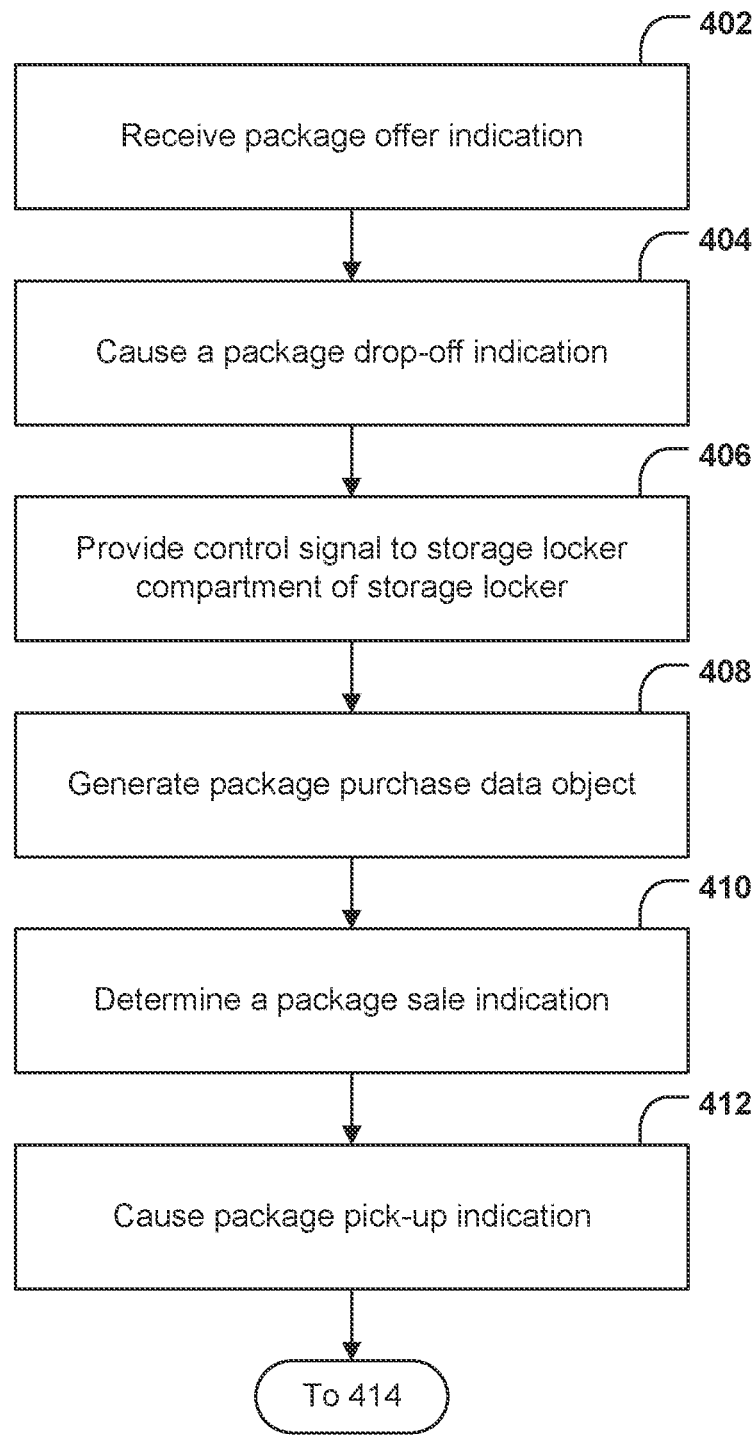
FIGS. 4A and 4B illustrates an example flowchart for securely facilitating a package transfer between parties, in accordance with some example embodiments described herein.
Figure 4B:
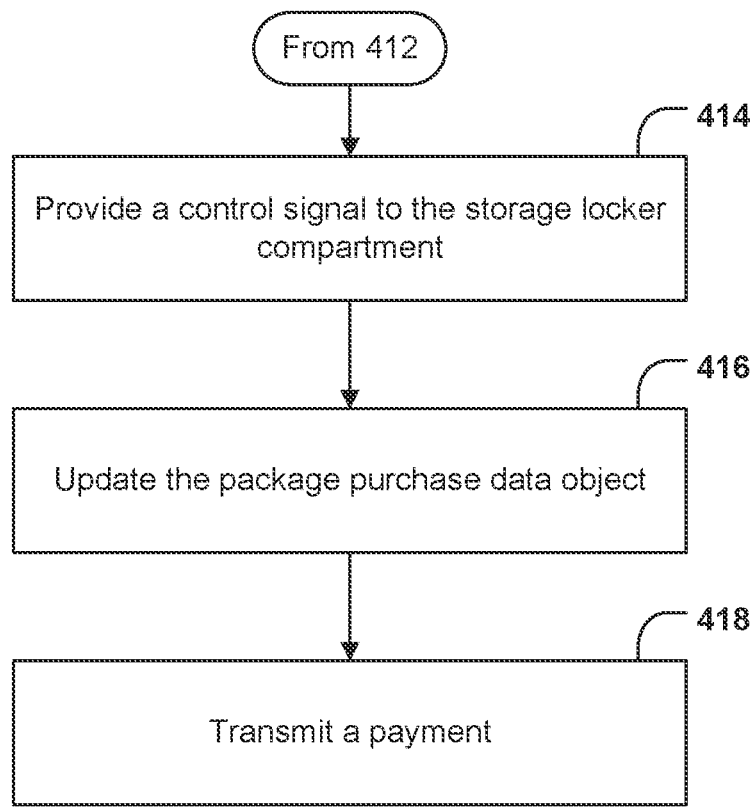

Turning to FIGS. 4A and 4B, example flowcharts are illustrated that contain example operations implemented by example embodiments described herein. The operations illustrated in FIGS. 4A and 4B may, for example, be performed by system device 104 of the secure package transfer system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, storage locker circuitry 208, payment circuitry 210, user authentication circuitry 212, package authentication circuitry 214 and/or any combination thereof. It will be understood that user interaction with the secure package transfer system 102 may occur directly via communications hardware 206 or may instead be facilitated by a separate facility device 112A-112N, as shown in FIG. 1, and which may have similar or equivalent physical componentry facilitating such user interaction.

Turning first to FIG. 4A, example operations are shown for securely facilitating a package transfer between parties.

As shown by operation 402, the apparatus 200 includes means, such as processor 202, memory 204, communications hardware 206, or the like, for receiving a package offer indication. A package offer indication may describe a package that is offered for sale by a seller described by a corresponding user identifier. The package offer indication may indicate that the seller wishes to store the package at an associated facility either now or in the future. In some embodiments, apparatus 200 may receive the package offer indication from a user device (e.g., one of user device 110A-110N) or from a facility device (e.g., one of facility device 112A-112N). For example, a seller may visit a facility and interact with a facility device, such as a kiosk or facility computer (facility device 112A-112N) to schedule a package drop-off for a particular time and/or date. Alternatively, a seller may complete an online form from their computer or smartphone (e.g., user device 110A-110N) to schedule a package drop-off such that he/she secures his/her package spot at a particular location for a particular time and/or date. By using his/her user device 110A-110N, the seller may advantageously proactively schedule the package drop-off at any available location without having to visit the physical facility first.

A seller may be the individual offering a package for sale. In some embodiments, a seller may be associated with a particular user identifier. Additionally, the seller may be associated with one or more user parameters associated with a seller described by the user identifier. A user identifier may uniquely identify the seller from one or more other individuals. A user identifier may be username, phone number, email address, driver's license number, permanent resident card number, social security number, passport number, and/or the like. User parameters may refer to data relevant to the seller (e.g., financial account data, user biometric data, user passwords/passcodes, user device data, phone numbers, email addresses, residential addresses, criminal record, or the like).

A package may include one or more physical items that are offered for sale by a seller. In some embodiments, a package may be associated with a package identifier which uniquely identifies the package from other packages. The package identifier may be a randomly generated value which is generated by the device associated with generating the package offer indication. A package may be associated with one or more package attributes that describe the package and/or package contents. Package attributes may include package dimensions (e.g., height, length, width, radius, diameter, etc.), shape, weight, color, indicia, item identifiers (e.g., barcodes, international mobile equipment identity (IMIEI, serial numbers, etc.), and/or the like. The one or more package attributes may also describe a package sale price and/or package purchase price. The package sale price may refer to the monetary amount for which the package is offered for sale. The package purchase price may refer to the monetary amount for which the package is sold for. The one or more package attributes may also be associated with one or more package sale price conditions that control and/or regulate the amount the package may be purchased for and/or the current package sale price.

The package offer indication may include a package identifier, one or more package attributes, and a user identifier associated with the seller. In some embodiments, the package offer indication may also include one or more user parameters for the seller described by the user identifier. For example, the package offer indication may describe that a package associated with the package identifier "P987654321" is being sold for 1000 U.S. dollars (e.g., package attribute) by John Smith who may be identified with a driver's license number of "0123456789" (e.g., user identifier) and that bank account "ABC123XYZ" (e.g., user parameter) is the account to which the funds from the sale of the package should be transferred to.

In some embodiments, the package offer indication may also include a drop-off user identifier, where the drop-off user identifier is indicative of a user identifier of an individual who is authorized to drop-off the package at the storage locker of a facility (e.g., the seller or another authorized individual). For example, the seller may be unable to make the scheduled package drop-off time and/or may wish for another trusted individual to drop the package off. As such, the seller may identify an authorized drop-off user which is included in the package offer indication. The drop-off user may subsequently be authenticated by apparatus 200 to ensure the user is authenticated to drop-off the package and thus, maintains the security and integrity of the package during delivery.

In some embodiments, the package offer indication may also include a user identifier associated with a buyer and a package purchase price, such as in instances where the package has already been sold. For example, a seller may have already found a buyer and the parties have settled on a package purchase price. As such, the seller may provide details of the buyer which may serve as a user identifier (e.g., a phone number, email address, etc.) as well as the package purchase price. In some embodiments, the package offer indication may also include one or more user parameters for the buyer described by the user identifier. For example, the package offer indication may describe a phone number of the buyer, which may serve as a user identifier and also provide an email address of the buyer, which may serve as a user parameter.

In some embodiments, the package offer indication may further include an indication as to whether the seller would like to opt-in to an immediately accessible funds program. The immediately accessible funds program may be offered to select sellers who satisfy the program criteria. Sellers who select to opt-in to the immediately accessible funds program may be evaluated to determine whether they fit the program criteria, such as by a user eligibility model, and in an instance the seller satisfies the program criteria, the seller may automatically be enrolled in the immediately accessible funds program. The immediately accessible funds program may allow for funds from an intermediary account to be transferred to a seller account upon deposit of the package. The amount of funds received from the intermediary account may be based on the current package sale price and/or one or more associated fees for enrolling in the program. For example, the immediately accessible funds program may offer to pay the seller 980 US dollars rather than the current package sale price of 1000 US dollars in accordance with a 2% fee in exchange for immediate transfer of the funds to the seller account.

In some embodiments, the processor 202 may be configured to access and utilize a user eligibility model, which may be stored in an associated memory such as memory 204 and/or storage device 106. The user eligibility model may process a package offer indication which indicates a seller would like to enroll in the immediately accessible funds program and generate a user eligibility outcome for the seller. The user eligibility model may be a rules-based model (e.g., a tree-based model) configured to follow a defined set of rules and/or operations to determine whether a user is eligible for the immediately accessible funds program. The user eligibility model may process the package offer indication to determine one or more user parameters and/or a user identifier associated with the seller. In some embodiments, the user eligibility model may query an associated memory and/or databases to determine one or more user parameters using the user identifier associated with the seller. The user eligibility model may then process the one or more user parameters to determine whether the one or more user parameters satisfy the one or more eligibility program criteria. For example, the one or more eligibility program criteria may require the seller to have no instances of fraud associated with his/her account as indicated by the one or more user parameters.

In an instance the one or more user parameters satisfy the one or more eligibility program criteria, the user eligibility model may determine the seller is eligible. In an instance the one or more user parameters fail to satisfy the one or more eligibility program criteria, the user eligibility model may determine the seller is not eligible. The user eligibility outcome may be a binary output indicative of whether the user is eligible for the immediately accessible funds program. For example, the user eligibility outcome may be categorical where the two possible user eligibility outcome categories are "eligible" and "not eligible". As another example, the user eligibility outcome may be numerical where the values are binary and are indicative of whether the user is eligible (e.g., 1) or not eligible (e.g., 0).

In an instance the seller is determined to be eligible for the immediately accessible funds program, the seller is enrolled in the program such that a destination account of the seller will be funded with the agreed upon value in response to a payment trigger event, as will be discussed in greater detail with respect to FIG. 10. In an instance the seller is determined to not be eligible for the immediately accessible funds program, the seller will receive an enrollment error notification informing him/her that the enrollment in the immediately accessible funds program was not successful and in some embodiments, an indication as to why the request for enrollment in the program was denied. The eligibility and/or enrollment status of the user (e.g., the seller) may be stored as a user parameter in the associated user profile.

Figure 12A:
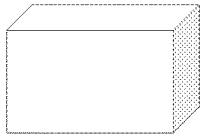
FIGS. 12A and 12B illustrate example user interfaces used in some example embodiments described herein.

FIG. 12A depicts an operational example of a user interface which a user may interact with to generate a package offer indication such that apparatus 200 subsequently receives the package offer indication. As shown in FIG. 12A, the user interface may request seller information 1202 from the seller, which may serve as a user identifier and/or user parameters. The user interface may also request package information 1204, which may serve as one or more package attributes. The user interface may additionally allow the seller to select an option to opt-in to the immediately accessible funds program such the seller will be evaluated for eligibility in the program. The user interface may further include a package drop-off time and/or date selection such that the seller may schedule the package drop-off. The user interface may further allow the seller to identify one or more authorized drop-off users who may drop-off the package for the seller. The user interface may further include a terms and conditions section, which the seller may have to read and agree to before the package offer indication may be received by the apparatus 200. The terms and conditions section may define associated usage fees, regulations, and/or conditions the buyer must follow in order to successfully utilize the facilities and/or the package as well as any repercussions for violations of the terms and/or conditions.

As shown by operation 404, the apparatus 200 includes means, such as processor 202, memory 204, communications hardware 206, user authentication circuitry 212, package authentication circuitry 214, or the like, for causing a package drop-off indication. A package drop-off indication may describe a package drop-off event at a facility in response to a candidate drop-off user being authenticated and/or the package being authenticated. The package drop-off indication may describe the candidate drop-off user data, an associated user authentication score for the candidate drop-off user, the one or more package attributes for the package, an associated package identity score threshold for the package, a package drop-off time, a package drop-off date, a package storage location, and/or the like. The package drop-off indication may trigger a control signal to be provided to a particular storage locker compartment of a storage locker of a facility, which causes the storage locker compartment to unlock and/or open such that the package may be placed in the storage locker compartment. In some embodiments, the package drop-off indication may further include a package identifier. The package identifier may be provided to a user device of the seller, buyer, and/or a pick-up user such a pick-up user may use the package identifier to quickly identify the package and storage compartment he/she is there to pick-up.

Figure 5:
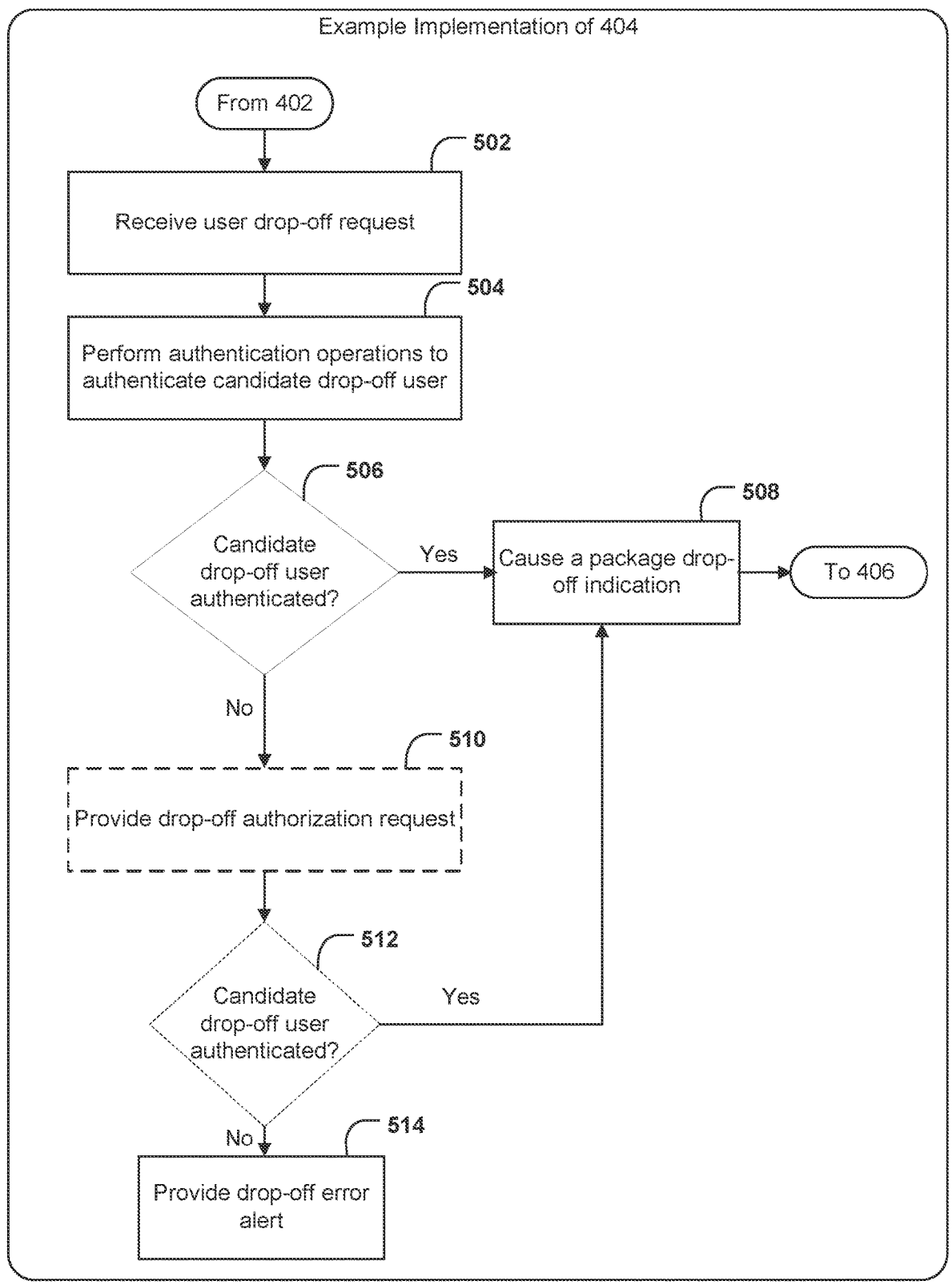
FIG. 5 illustrates an example flowchart for causing a package drop-off indication, in accordance with some example embodiments described herein.

In some embodiments, operation 404 may be performed in accordance with the operations described by FIG. 5. Turning now to FIG. 5, example operations are shown for causing a package drop-off indication.

As shown by operation 502, the apparatus 200 includes means, such as processor 202, memory 204, communications hardware 206, or the like, for receiving a user drop-off request. A user drop-off request may describe a request for authentication of a candidate user to drop-off a package. The user drop-off request may be received from a facility device 112A-112N. In particular, the user drop-off request may be received once a candidate drop-off user is within the facility and is attempting to drop-off a package. For example, a candidate drop-off user may interact with a facility device 112A-112N to indicate he/she would like to drop-off a package.

The user drop-off request may include candidate drop-off user data for a candidate drop-off user. Candidate drop-off user data may include a user identifier for the user attempting to drop-off the package as well as one or more captured user parameters, such as one or more captured images depicting the candidate drop-off user, one or more biometric scans of the candidate drop-off user, and/or one or more other authentication credentials (e.g., usernames, passwords/passcodes, etc.). The candidate drop-off user data may be captured passively such that no candidate drop-off user input is required, such as via cameras, scanners, and/or the like. In some embodiments, candidate drop-off user data may be captured in response to user interaction. For example, a facility device 112A-112N may provide the candidate drop-off user with one or more prompts to capture candidate drop-off user data. For example, the facility device 112A-112N may prompt the candidate drop-off user for biometric data (e.g., a fingerprint or retina scan), a username and/or password, and/or the like.

As shown by operation 504, the apparatus 200 includes means, such as processor 202, memory 204, communications hardware 206, user authentication circuitry 212 or the like, for performing one or more authentication operations to authenticate a candidate drop-off user. In some embodiments, the user authentication circuitry 212 may use a user authentication model to perform the one or more authentication operations to authenticate the candidate drop-off user.

The user authentication model may process one or more user parameters captured for the candidate drop-off user, perform one or more authentication operations, and generate a user authentication outcome for the candidate drop-off user. Additionally, the user authentication model may be configured to determine whether the candidate drop-off user is associated with permission to perform the drop-off activity. In some embodiments, the user authentication model may be a trained machine learning model, such as a neural network. Alternatively, the user authentication model may be a rules-based model (e.g., a tree-based model) configured to follow a defined set of rules and/or operations to determine whether the candidate drop-off user is authenticated.

In some embodiments, the user authentication model may be configured to first determine whether a candidate drop-off user is associated with permission to perform the drop-off activity prior to generating a user identification confidence score for the candidate drop-off user. In an instance the candidate drop-off user is not associated with permission to perform the drop-off activity, the user may automatically fail to be authenticated. The candidate drop-off user may be determined to fail authentication prior to generating the user identification confidence score. In an instance the candidate drop-off user is associated with permission to perform the drop-off activity, the user authentication model may generate a user identification confidence score for the candidate drop-off user.

In some embodiments, the user authentication model may be configured to generate a user identification confidence score that describes a numerical value which provides a determined measure of confidence that the candidate drop-off user is the user they are claiming to be. The user authentication model may be configured to determine a user identification confidence score for a captured user parameter based on comparison of the values described by the captured user parameter to one or more corresponding values for stored user parameters stored in a user profile associated with the corresponding user identifier. In some embodiments, the user authentication model may generate the user authentication outcome based on the user identification confidence score and/or one or more user identification confidence score thresholds.

In some embodiments, the user authentication model may determine whether a value of a captured user parameter is an exact match to a stored user parameter such that the user identification confidence score for the captured user parameter is binary (e.g., match/non-match, 0/1, etc.). In some embodiments, the user authentication model may employ any suitable algorithm to process the captured user parameters (e.g., principal component analysis, linear discriminant analysis, etc.), such as for biometric analyses. In some embodiments, the user authentication model may employ any suitable clustering algorithms including but not limited to affinity propagation, agglomerative clustering, balanced iterative reducing and clustering using hierarchies (BIRCH), density-based spatial clustering of applications with noise (DBSCAN), k-means, mini-batch k-means, mean shift, ordering points to identify cluster structure (OPTICS), spectral clustering, mixture of Gaussians, and/or the like. In some embodiments, the user authentication model may cluster one or more captured user parameters with one or more stored user parameters. In some embodiments, the user identification confidence score may be determined based on an inter-cluster distance between two or more clusters for a particular captured user parameter.

Once the user authentication model has generated the user identification confidence score and determined whether the candidate drop-off user is associated with permission to perform the drop-off activity, the user authentication model may determine whether the user is successfully authenticated. For example, once the user authentication model generates the user identification confidence score for the candidate drop-off user, it may determine whether the user identification confidence score satisfies one or more user identification confidence score thresholds. In an instance the user identification confidence score satisfies the one or more user identification confidence score thresholds, and the candidate drop-off user is determined to be associated with permission to perform the drop-off activity, the candidate drop-off user may be authenticated. Otherwise, the candidate drop-off user may fail to be authenticated.

The user authentication outcome may be a binary output indicative of whether the candidate drop-off user is authenticated. For example, the user authentication outcome may be categorical where the two possible user authentication outcome categories are "authenticated" and "not authenticated". As another example, the user authentication outcome may be numerical where the values are binary and are indicative of whether the user is authenticated (e.g., 1) or not authenticated (e.g., 0).

As shown by operation 506, the apparatus 200 includes means, such as processor 202, memory 204, communications hardware 206, user authentication circuitry 212 or the like, for determining whether the candidate drop-off user is authenticated. As described above, the user authentication circuitry may use the output from the user authentication model to determine whether the candidate drop-off user is authenticated.

In an instance the candidate drop-off user is authenticated, the process proceeds to operation 508. As shown by operation 508, the apparatus 200 includes means, such as processor 202, memory 204, communications hardware 206, user authentication circuitry 212 or the like, for causing a package drop-off indication. The user authentication circuitry 212 may cause the package drop-off indication as described above in operation 404.

Optionally, in an instance the candidate drop-off user is not authenticated (e.g., fails one or more authentication operations), the process may proceed to operation 510. As shown by operation 510, the apparatus 200 includes means, such as processor 202, memory 204, communications hardware 206, user authentication circuitry 212 or the like, for providing one or more drop-off authorization requests. A drop-off authorization request may describe a message that can be sent to a seller to request the seller to provide authorization that the candidate drop-off user is authorized to drop-off the package. In some embodiments, the drop-off authorization request may be sent to a seller only in instances where a user identification confidence score satisfies the one or more user identification confidence score thresholds but the candidate drop-off user is not determined to be associated with permission to perform the drop-off activity. The drop-off authorization may allow for the seller to enter user input indicative of whether the package may be dropped-off by a drop-off user, details about the drop-off user, and/or an indication as to whether the particular user as identified by the user authorization model is authorized to drop-off the package.

As shown by operation 512, the apparatus 200 includes means, such as processor 202, memory 204, communications hardware 206, user authentication circuitry 212 or the like, for determining whether the candidate drop-off user is authenticated after a drop-off authorization request is provided. In an instance a seller provides additional drop-off user details and/or authorization responsive to the drop-off authorization request, the one or more authentication operations parameters may be performed again similarly as described in operation 504.

In an instance the candidate drop-off user is authenticated, the process proceeds to operation 508, as described above.

In an instance the candidate drop-off user is not authenticated, the process proceeds to operation 514. As shown by operation 514, the apparatus 200 includes means, such as processor 202, memory 204, communications hardware 206, user authentication circuitry 212 or the like, for providing one or more drop-off error alerts. A drop-off error alert may be provided to a seller and may indicate that a candidate drop-off user attempted to drop-off his/her package and was not able to be authenticated. In some embodiments, the drop-off error alert may include additional details of the attempt, such as the facility location, the time of the attempt by the candidate drop-off user, and/or the like. In some embodiments, a drop-off error alert may be sent to one or more administrators in real-time such that one or more administrators and/or security personnel may investigate the incident.

Figure 6:
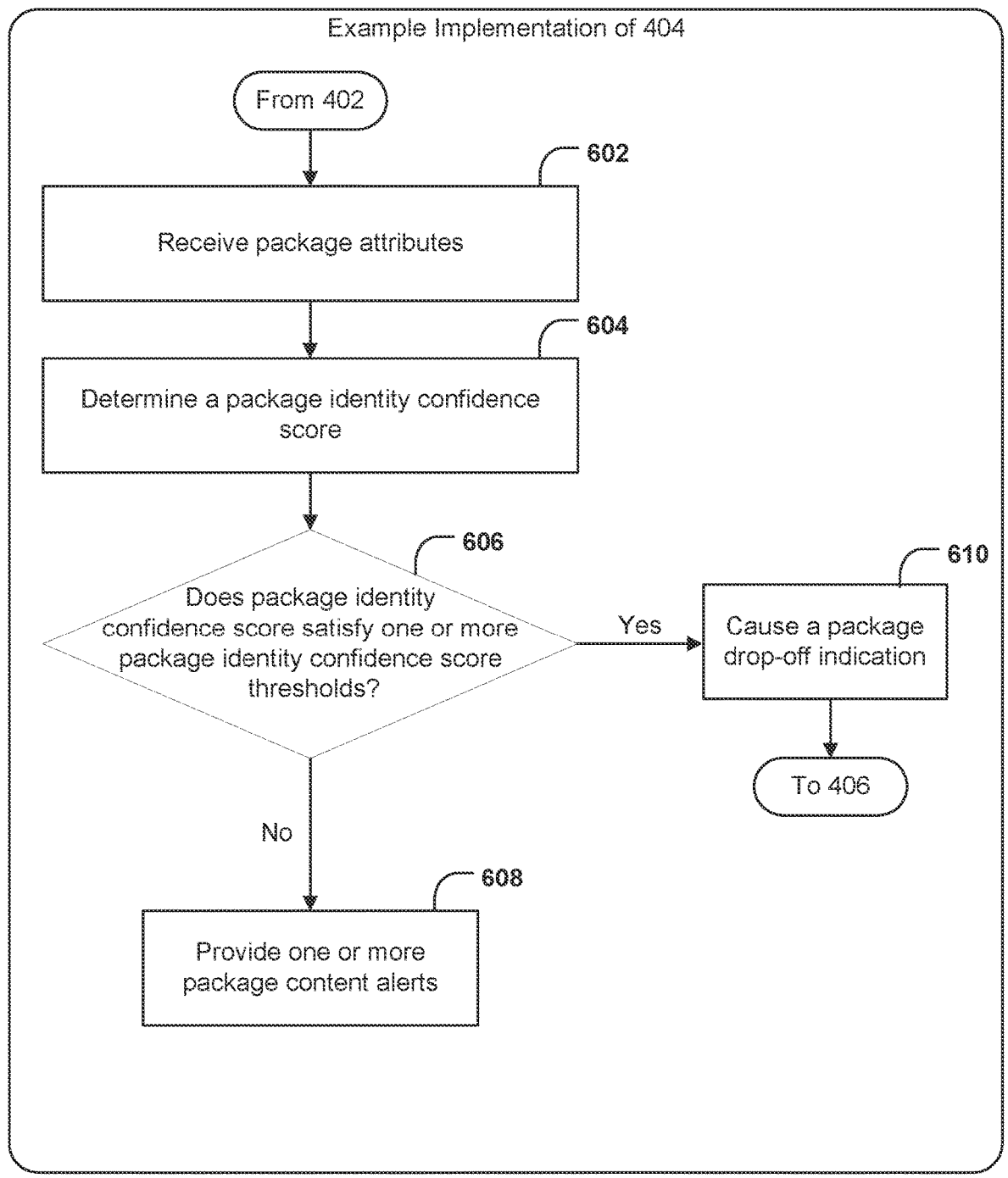
FIG. 6 illustrates an example flowchart for causing a package drop-off indication based on a package identity confidence score, in accordance with some example embodiments described herein.

Additionally, in some embodiments operation 408 may be performed in accordance with the operations described by FIG. 6. Turning now to FIG. 6, example operations are shown for causing a package drop-off indication.

As shown by operation 602, the apparatus 200 includes means, such as processor 202, memory 204, communications hardware 206, or the like, for receiving one or more package attributes. In some embodiments, the user drop-off request further includes or more package attributes captured for the package to be dropped-off by the candidate drop-off user. Additionally or alternatively, the one or more package attributes may be used to determine a package identity confidence score for the package. The facility device 112A-112N may weigh, scan, or otherwise assess the package and/or package contents to determine the one or more package attributes.

As shown by operation 604, the apparatus 200 includes means, such as processor 202, memory 204, communications hardware 206, package authentication circuitry 214, or the like, for determining a package identity confidence score associated with the package. In some embodiments, the package authentication circuitry 214 may be configured to use a package authentication model to determine the package identity confidence score.

A package authentication model may be configured to process one or more package attributes described by the package offer indication and captured by a facility device to generate a package identity confidence score for the package. In some embodiments, the package authentication model may be a trained machine learning model, such as a neural network. Alternatively, the package authentication model may be a rules-based model (e.g., a tree-based model) configured to follow a defined set of rules and/or operations to determine a package identity confidence score.

The package authentication model may be configured to compare the package attributes as provided by the package offer indication to similar values captured by the facility device to determine an attribute similarity score for each package attribute. For example, the package authentication model may generate a comparison between a weight package attribute as described by the package offer indication (e.g., as provided by the seller) and a captured package weight attribute as captured by a facility device. If the captured weight value of the package is determined to be within a particular threshold (e.g., within a predefined value or percentage) of the provided weight value, then the weight package attribute may be determined to be a match. Additionally, the package authentication model may be configured to query one or more external repositories and/or databases for attribute values to compare the captured package attributes to in order to ensure the package and/or package contents are authentic. By way of continuing example, if a package content is a mobile device of model XYZ, the package authentication model may be configured to query the weight of the mobile device of model XYZ from online repositories and/or databases and compare the queried weight to the captured package weight attribute as captured by the facility device. Similarly, if the captured weight value of the package is determined to be within a particular threshold (e.g., within a predefined value or percentage) of the queried weight value, then the weight package attribute may be determined to be a match.

In some embodiments, the package authentication model may further be configured to perform one or more security checks, which may include performing a search using the one or more captured package attributes to ensure the package and/or package content is not associated with a stolen item. By way of continuing example, the captured package attribute may include an IMEI of the mobile device of model XYZ such that the package authentication model may perform a search with the IMEI of the mobile device to ensure the IMEI is not associated with a stolen device. The package authentication model may generate the package identity confidence score based on the number of package attribute matches and the results of the one or more security checks. The package identity confidence score may be a numeric value within a predetermined range of values that is indicative of the inferred confidence that the package and/or package contents are authentic as claimed by the seller.

In some embodiments, the apparatus 200 may receive a package identity confidence score from a facility device 112A-112N, which may use package authentication circuitry 314 to generate a package identity confidence score similarly as described above. Thus, the package authentication circuitry 214 may determine the package identity confidence score may be determined based on the received package identity confidence score from the facility device 112A-112N.

As shown by operation 606, the apparatus 200 includes means, such as processor 202, memory 204, communications hardware 206, package authentication circuitry 214, or the like, for determining whether the package identity confidence score satisfies one or more package identity confidence score thresholds. Once the package authentication circuitry 214 has determined the package identity confidence score, the package authentication circuitry may compare the package identity confidence score to one or more package identity confidence score thresholds. The one or more package identity confidence score thresholds may be one or more predetermined package identity confidence scores which the package identity confidence score must satisfy. For example, a package identity confidence score threshold may be 0.6 such that the package identity confidence score of the package must be greater than or equal to 0.6 in order to satisfy the package identity confidence score threshold.

In an instance the package identity confidence score fails to satisfy the one or more package identity confidence score thresholds, the process proceeds to operation 608. As shown by operation 608, the apparatus 200 includes means, such as processor 202, memory 204, communications hardware 206, package authentication circuitry 214, or the like, for providing one or more package content alerts. The one or more package content alerts may be generated by the package authentication circuitry 214 and may describe that the package and/or one or more package contents could not be authenticated. The package content alert may describe the offending items such that a user may be made aware of the reason for authentication failure. The package content alert may be provided to a user device 110A-110N of the seller and/or drop-off user as well as a to a facility device 112A-N to alert one or more administrators or other facility employee of the error. The package content alert may be generated in real-time or near real-time such that a recipient user may take action as soon as the package authentication is determined to fail.

In an instance the package identity confidence score satisfies the one or more package identity confidence score thresholds, the process proceeds to operation 610. As shown by operation 610, the apparatus 200 includes means, such as processor 202, memory 204, communications hardware 206, payment circuitry 210, or the like, for causing a package drop-off indication.

Returning now to FIG. 4A, as shown by operation 406, the apparatus 200 includes means, such as processor 202, memory 204, communications hardware 206, storage locker circuitry 208, or the like, for providing a control signal to a storage locker compartment of a storage locker. In some embodiments, the storage locker circuitry 208 may provide the control signal to the storage locker compartment of the storage locker once the package drop-off indication is determined. The provided control signal causes the storage locker compartment to unlock and/or open such that the package may be placed into the storage locker compartment by the drop-off user. The storage locker circuitry 208 may generate and provide a storage locker compartment message to a facility device 112A-112N and/or user device 110A-110N of the drop-off user to depict where the unlocked and assigned storage locker compartment is located relative to the other storage locker compartments and/or other identifying storage locker compartment information (e.g., a storage locker number, row number, etc.). The facility device 112A-112N and/or user device 110A-110N may be then display the information from the storage locker compartment message such that a drop-off user may navigate the storage lockers to find the assigned storage locker compartment.

In some embodiments, the storage locker circuitry 208 may be select the particular storage locker compartment based on the one or more package attributes as described by the package offer indication and/or as captured by a facility device 112A-112N. The storage locker circuitry 208 may select the storage locker compartment based on storage locker compartment availability (e.g., not currently housing an item and not reserved for a particular date) and based on the one or more package attributes which describe package dimensions, shape, or size. The storage locker circuitry 208 may select the smallest storage locker size which may still accommodate the dimensions of the package. As such, the storage locker circuitry 208 may optimize the storage of packages within the storage locker.

In an instance the storage locker circuitry 208 determines no storage locker compartments are currently available, the storage locker circuitry 208 may generate one or more drop-off error alert, which may indicate that no storage locker compartments which accommodate the package size are currently available. The drop-off error alert may further include one or more alternative drop-off dates and/or times which a user may select to reserve a storage locker compartment. The one or more drop-off error alerts may be provided to a seller and/or drop-off user such that the seller and/or drop-off user may interact with the drop-off error alert to schedule a future drop-off time for the package.

As shown by operation 408, the apparatus 200 includes means, such as processor 202, memory 204, communications hardware 206, payment circuitry 210, or the like, for generating a package purchase data object. The payment circuitry 210 may generate the package purchase data object to include data relating to the purchase of a package. In particular, the package purchase data object may include the seller identifier and a destination account which may receive the funds from the purchase of the package. In the instance the package is not yet sold, the package purchase data object may include the package sale price. In the instance the package is sold, and the buyer details and purchase price are described by the package offer indications, the package purchase data object may also include the package purchase price, the buyer identifier, and a withdrawal account from which funds may be withdrawn from to fund the purchase of the package. In some embodiments, in the instance the seller is enrolled in the immediately accessible funds program the package purchase data object may further include an intermediary account, from which funds may be withdrawn to fund the seller account upon deposit of the package and to which funds may be deposited as received from a buyer account upon collection of the package. The package purchase data object may be subsequently updated as information becomes available. For example, the payment circuitry 210 may update the package purchase data object in the instance the package sale price changes.

As shown by operation 410, the apparatus 200 includes means, such as processor 202, memory 204, communications hardware 206, payment circuitry 210, or the like, for determining a package sale indication. A package sale indication may describe that the package has been purchased by a buyer described by a corresponding user identifier. The package sale indication may indicate that the buyer wishes to pick-up the package either now or in the future. In some embodiments, apparatus 200 may receive the package sale indication from a user device (e.g., one of user device 110A-110N) or from a facility device (e.g., one of facility device 112A-112N). For example, a buyer may visit a facility and interact with a facility device, such as a kiosk or facility computer (facility device 112A-112N) to schedule a package pick-up for a particular time and/or date. Alternatively, a buyer may complete an online form from their computer or smartphone (e.g., user device 110A-110N) to schedule a package pick-up for a particular time and/or date. In some embodiments, the package sale indication may be determined in one of two ways, as will be described in greater detail with respect to FIG. 7.

The package sale indication may include a package identifier and a user identifier associated with the buyer. The package identifier may be used to match the package sale indication with a corresponding package offer indication and/or package purchase data object such that the corresponding package for the buyer may be determined. In some embodiments, the package sale indication may also include one or more user parameters for the buyer described by the user identifier. In some embodiments, the package sale indication may also include a pick-up user identifier, where the pick-up user identifier is indicative of a user identifier of an individual who is authorized to pick-up the package at the storage locker of a facility (e.g., the buyer or another authorized individual). The package sale indication may also include a package purchase price.

A buyer may be the individual purchasing the package and is associated with a particular user identifier. Additionally, the buyer may be associated with one or more user parameters associated with a buyer described by the user identifier. A user identifier may uniquely identify the buyer from one or more other individuals. A user identifier may be username, phone number, email address, driver's license number, permanent resident card number, social security number, passport number, and/or the like. User parameters may refer to data relevant to the buyer (e.g., financial account data, user biometric data, user passwords/passcodes, user device data, phone numbers, email addresses, residential addresses, criminal record, or the like). In some embodiments, the user identifier may be used to query an associated memory and/or information databases to determine the one or more user parameters associated with the user identifier. In some embodiments, the user identifier may be associated with a user profile stored in an associated memory, which may include one or more user parameters. If the user identifier is determined not to be associated with an existing user profile, a user profile may be generated for the buyer and the one or more queried or otherwise determine user parameters may be stored in the corresponding user profile.

Figure 7:
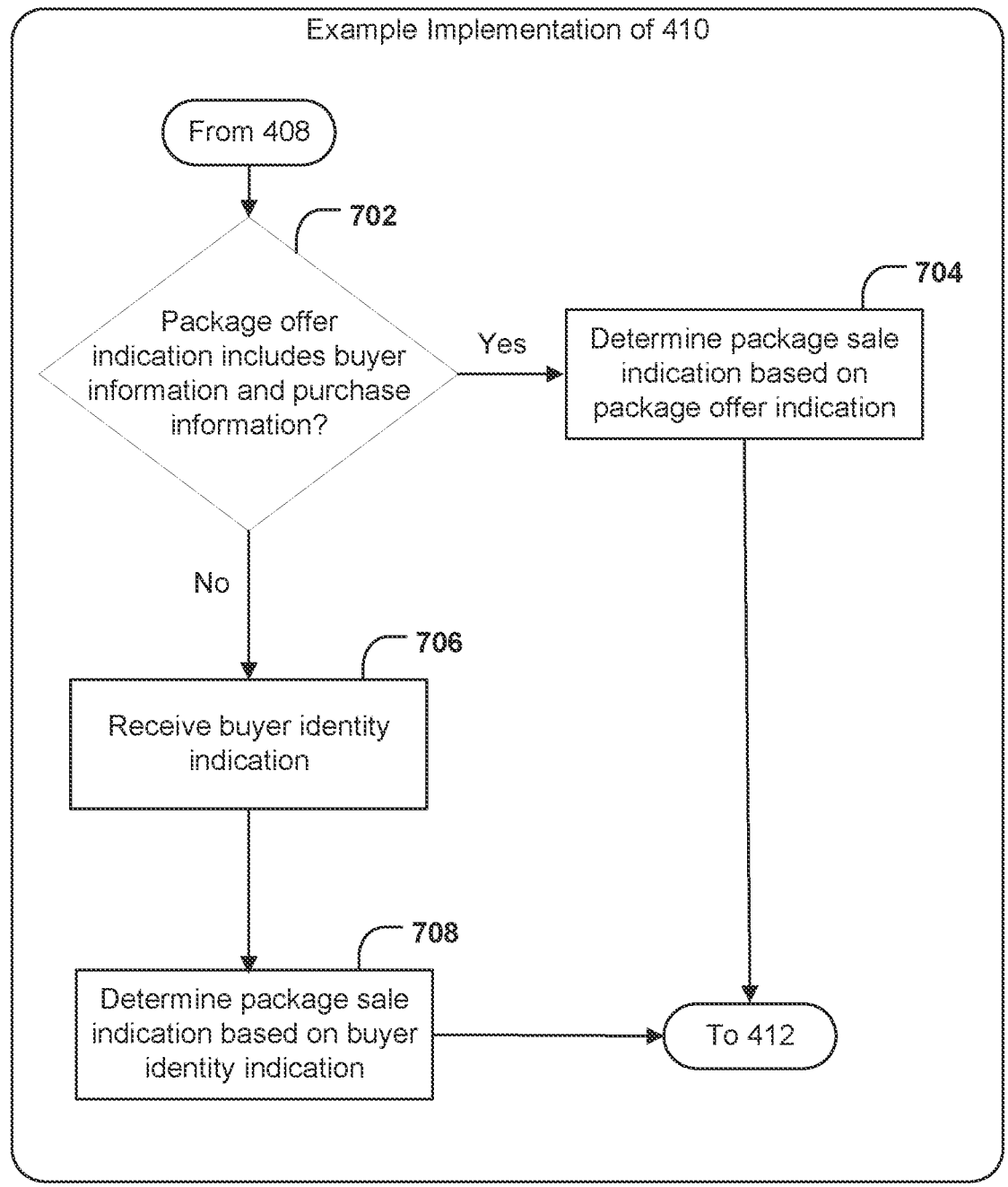
FIG. 7 illustrates an example flowchart for determining a package sale indication, in accordance with some example embodiments described herein.

In some embodiments, operation 410 may be performed in accordance with the operations described by FIG. 7. Turning now to FIG. 7, example operations are shown for determining a package sale indication.

As shown by operation 702, the apparatus 200 includes means, such as processor 202, memory 204, communications hardware 206, payment circuitry 210 or the like, for determining whether the package offer indication includes buyer information and purchase information. As previously described, in some embodiments the package offer indication may include buyer information (e.g., a user identifier and/or account parameters for the buyer) and purchase information (e.g., a package purchase price). The payment circuitry 210 may determine whether the package offer indication includes all necessary information and determine the package sale indication based on the package offer indication.

In an instance the package offer indication includes buyer information and purchase information, the process proceeds to operation 704. As shown by operation 704, the apparatus 200 includes means, such as processor 202, memory 204, communications hardware 206, payment circuitry 210 or the like, for determining the package sale indication based on the package offer indication. In the instance the package offer indication includes the necessary buyer information and/or purchase information, the payment circuitry 210 package offer indication may thus be determined based on the information included in the package offer indication, without requiring subsequent communications with the buyer, seller, or other party.

In an instance the package offer indication does not include buyer information and/or purchase information, the process proceeds to operation 706. As shown by operation 706, the apparatus 200 includes means, such as processor 202, memory 204, communications hardware 206, payment circuitry 210 or the like, for receiving a buyer identity indication. In the instance the package offer indication does not include the necessary buyer information and/or purchase information, the payment circuitry 210 may wait until a buyer identity indication is received. The buyer identity indication may describe the user identifier and one or more user parameters corresponding to the buyer as well as the package identifier and the package purchase price.

In some embodiments, in an instance the package offer indication does not include buyer information and/or purchase information, the payment circuitry 210 may generate a buyer identity request and provide it to the user device 110A-110N corresponding to the seller. The seller may forward the request to a buyer in an instance the package is sold and/or may respond to the buyer identity request with a buyer identifier or buyer contact information such that the payment circuitry 210 may provide the buyer identity request to the user device 110A-110N of the buyer.

As shown by operation 708, the apparatus 200 includes means, such as processor 202, memory 204, communications hardware 206, payment circuitry 210 or the like, for determining the package sale indication based on the buyer identity indication. Once payment circuitry 210 receives the buyer identity indication, the payment circuitry 210 may determine the package sale indication based on the information described by the buyer identity indication.

Figure 12B:
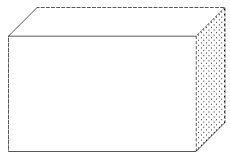

FIG. 12B depicts an operational example of a user interface which a user may interact with to generate a buyer identity indication such that apparatus 200 subsequently receives the buyer identity indication. As shown in FIG. 12B, the user interface may request buyer information 1254 from the buyer, which may serve as a user identifier and/or user parameters. The user interface may also request package information 1252, and particularly may request the package identifier such that the corresponding package offer indication may be determined. The user interface may further include a package drop-off time and/or date selection such that the seller may schedule the package drop-off. The user interface may further allow the buyer to identify one or more authorized pick-up users who may pick-up the package for the buyer. The user interface may further include a terms and conditions section, which the buyer may have to read and agree to before the buyer identity indication may be received by the apparatus 200. The terms and conditions section may define associated usage fees, regulations, and/or conditions the buyer must follow in order to successfully pick-up the package as well as any repercussions for violations of the terms and/or conditions.

Returning now to FIG. 4A, as shown by operation 412, the apparatus 200 includes means, such as processor 202, memory 204, communications hardware 206, user authentication circuitry 212, or the like, for causing a package pick-up indication. A package pick-up indication may describe a package pick-up event at a facility in response to a candidate pick-up user being authenticated. The package pick-up indication may describe the candidate pick-up user data, an associated user authentication score for the candidate pick-up user, a package pick-up time, a package pick-up date, a package storage location, and/or the like. The package pick-up indication may trigger a control signal to be provided to the particular storage locker compartment of a storage locker storing the package, which causes the storage locker compartment to unlock such that the package may be removed from the storage locker compartment.

Figure 8:
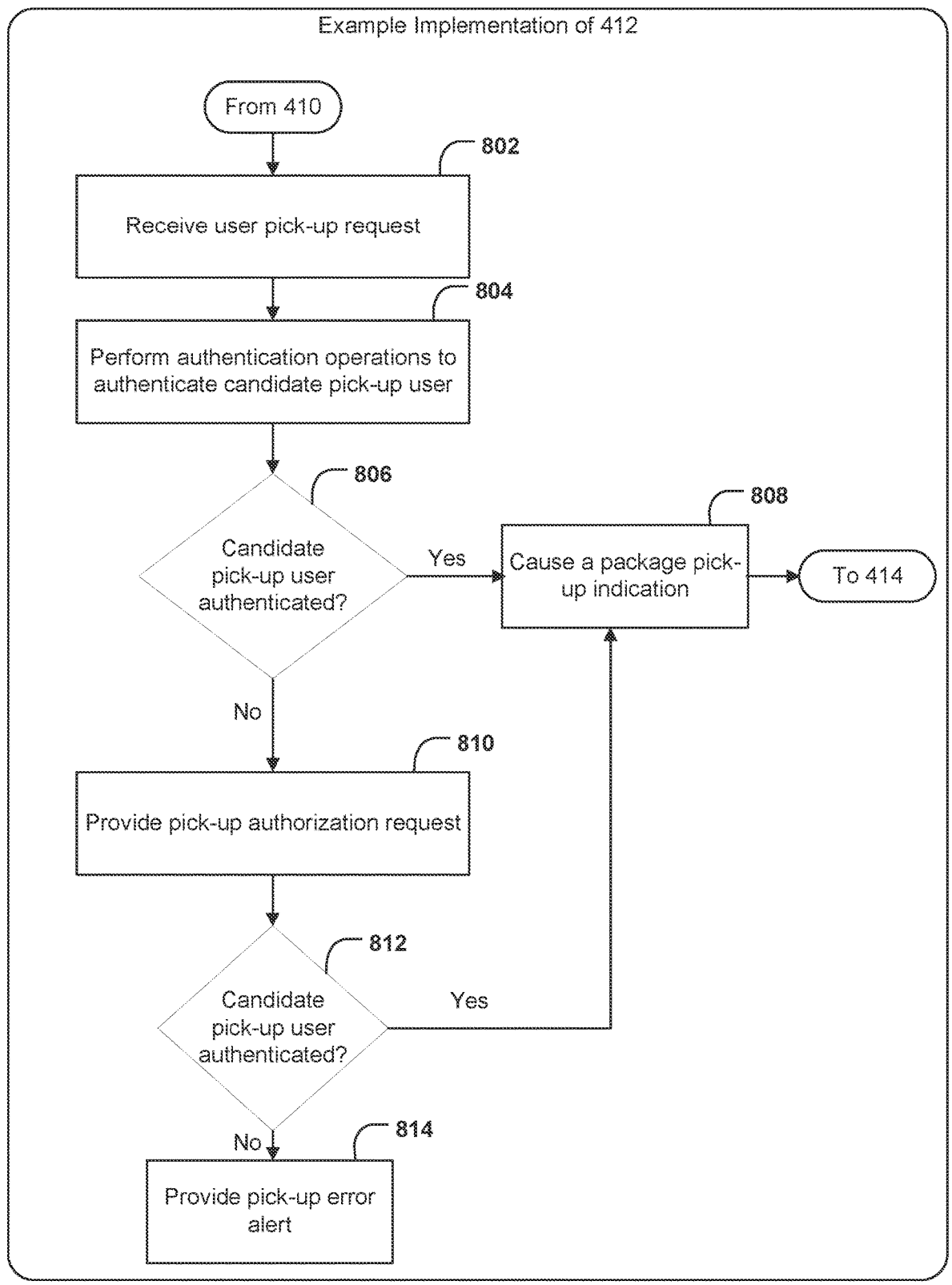
FIG. 8 illustrates an example flowchart for causing a package pick-up indication, in accordance with some example embodiments described herein.

In some embodiments, operation 412 may be performed in accordance with the operations described by FIG. 8. Turning now to FIG. 8, example operations are shown for causing a package pick-up indication.

As shown by operation 802, the apparatus 200 includes means, such as processor 202, memory 204, communications hardware 206, or the like, for receiving a user pick-up request. A user pick-up request may describe a request for authentication of a candidate user to pick-up a package. The user pick-up request may be received from a facility device 112A-112N. In particular, the user pick-up request may be received once a candidate pick-up user is within the facility and is attempting to pick-up a package. For example, a candidate pick-up user may interact with a facility device 112A-112N to indicate he/she would like to pick-up a package.

The user pick-up request may include candidate pick-up user data for a candidate pick-up user. Candidate pick-up user data may include a user identifier for the user attempting to pick-up the package as well as one or more captured user parameters, such as one or more captured images depicting the candidate pick-up user, one or more biometric scans of the candidate pick-up user, and/or one or more other authentication credentials (e.g., usernames, passwords/passcodes, etc.). The candidate pick-up user data may be captured passively such that no candidate pick-up user input is required, such as via cameras, scanners, and/or the like. In some embodiments, candidate pick-up user data may be captured in response to user interaction. For example, a facility device 112A-112N may provide the candidate pick-up user with one or more prompts to capture candidate pick-up user data. For example, the facility device 112A-112N may prompt the candidate pick-up user for biometric data (e.g., a fingerprint or retina scan), a username and/or password, and/or the like.

As shown by operation 804, the apparatus 200 includes means, such as processor 202, memory 204, communications hardware 206, user authentication circuitry 212 or the like, for performing one or more authentication operations to authenticate a candidate pick-up user. In some embodiments, the user authentication circuitry 212 may use a user authentication model to perform the one or more authentication operations to authenticate the candidate pick-up user.

As previously described, the user authentication model may process one or more user parameters captured for the candidate pick-up user, perform one or more authentication operations, and generate a user authentication outcome for the candidate pick-up user. Additionally, the user authentication model may be configured to determine whether the candidate pick-up user is associated with permission to perform the pick-up activity. In some embodiments, the user authentication model may be a trained machine learning model, such as a neural network. Alternatively, the user authentication model may be a rules-based model (e.g., a tree-based model) configured to follow a defined set of rules and/or operations to determine whether the candidate pick-up user is authenticated.

In some embodiments, the user authentication model may be configured to first determine whether a candidate pick-up user is associated with permission to perform the pick-up activity prior to generating a user identification confidence score for the candidate pick-up user. In an instance the candidate pick-up user is not associated with permission to perform the pick-up activity, the user may automatically fail to be authenticated. The candidate pick-up user may be determined to fail authentication prior to generating the user identification confidence score. In an instance the candidate pick-up user is associated with permission to perform the pick-up activity, the user authentication model may generate a user identification confidence score for the candidate pick-up user.

In some embodiments, the user authentication model may be configured to generate a user identification confidence score that describes a numerical value which provides a determined measure of confidence that the candidate pick-up user is the user they are claiming to be. The user authentication model may be configured to determine a user identification confidence score for a captured user parameter based on comparison of the values described by the captured user parameter to one or more corresponding values for stored user parameters stored in a user profile associated with the corresponding user identifier. In some embodiments, the user authentication model may generate the user authentication outcome based on the user identification confidence score and/or one or more user identification confidence score thresholds.

In some embodiments, the user authentication model may determine whether a value of a captured user parameter is an exact match to a stored user parameter such that the user identification confidence score for the captured user parameter is binary (e.g., match/non-match, 0/1, etc.). In some embodiments, the user authentication model may employ any suitable algorithm to process the captured user parameters (e.g., principal component analysis, linear discriminant analysis, etc.), such as for biometric analyses. In some embodiments, the user authentication model may employ any suitable clustering algorithms including but not limited to affinity propagation, agglomerative clustering, balanced iterative reducing and clustering using hierarchies (BIRCH), density-based spatial clustering of applications with noise (DBSCAN), k-means, mini-batch k-means, mean shift, ordering points to identify cluster structure (OPTICS), spectral clustering, mixture of Gaussians, and/or the like. In some embodiments, the user authentication model may cluster one or more captured user parameters with one or more stored user parameters. In some embodiments, the user identification confidence score may be determined based on an inter-cluster distance between two or more clusters for a particular captured user parameter.

Once the user authentication model has generated the user identification confidence score and determined whether the candidate pick-up user is associated with permission to perform the pick-up activity, the user authentication model may determine whether the user is successfully authenticated. For example, once the user authentication model generates the user identification confidence score for the candidate pick-up user, it may determine whether the user identification confidence score satisfies one or more user identification confidence score thresholds. In an instance the user identification confidence score satisfies the one or more user identification confidence score thresholds, and the candidate pick-up user is determined to be associated with permission to perform the pick-up activity, the candidate pick-up user may be authenticated. Otherwise, the candidate pick-up user may fail to be authenticated.

The user authentication outcome may be a binary output indicative of whether the candidate pick-up user is authenticated. For example, the user authentication outcome may be categorical where the two possible user authentication outcome categories are "authenticated" and "not authenticated". As another example, the user authentication outcome may be numerical where the values are binary and are indicative of whether the user is authenticated (e.g., 1) or not authenticated (e.g., 0).

As shown by operation 806, the apparatus 200 includes means, such as processor 202, memory 204, communications hardware 206, user authentication circuitry 212 or the like, for determining whether the candidate pick-up user is authenticated. As described above, the user authentication circuitry may use the output from the user authentication model to determine whether the candidate pick-up user is authenticated.

In an instance the candidate pick-up user is authenticated, the process proceeds to operation 808. As shown by operation 808, the apparatus 200 includes means, such as processor 202, memory 204, communications hardware 206, user authentication circuitry 212 or the like, for causing a package pick-up indication. The user authentication circuitry 212 may cause the package pick-up indication as described above in operation 412.

Optionally, in an instance the candidate pick-up user is not authenticated (e.g., fails one or more authentication operations), the process may proceed to operation 510. As shown by operation 810, the apparatus 200 includes means, such as processor 202, memory 204, communications hardware 206, user authentication circuitry 212 or the like, for providing one or more pick-up authorization requests. A pick-up authorization request may describe a message that can be sent to a buyer to request the buyer to provide authorization that the candidate pick-up user is authorized to pick-up the package. In some embodiments, the pick-up authorization request may be sent to a buyer only in instances where a user identification confidence score satisfies the one or more user identification confidence score thresholds, but the candidate pick-up user is not determined to be associated with permission to perform the pick-up activity. The pick-up authorization may allow for the buyer to enter user input indicative of whether the package may be dropped-off by a pick-up user, details about the pick-up user, and/or an indication as to whether the particular user as identified by the user authorization model is authorized to pick-up the package.

As shown by operation 812, the apparatus 200 includes means, such as processor 202, memory 204, communications hardware 206, user authentication circuitry 212 or the like, for determining whether the candidate pick-up user is authenticated after a pick-up authorization request is provided. In an instance a seller provides additional pick-up user details and/or authorization responsive to the pick-up authorization request, the one or more authentication operations parameters may be performed again similarly as described in operation 804.

In an instance the candidate pick-up user is authenticated, the process proceeds to operation 808, as described above.

In an instance the candidate pick-up user is not authenticated, the process proceeds to operation 514. As shown by operation 514, the apparatus 200 includes means, such as processor 202, memory 204, communications hardware 206, user authentication circuitry 212 or the like, for providing one or more pick-up error alerts. A pick-up error alert may be provided to a seller and may indicate that a candidate pick-up user attempted to pick-up his/her package and was not able to be authenticated. In some embodiments, the pick-up error alert may include additional details of the attempt, such as the facility location, the time of the attempt by the candidate pick-up user, and/or the like. In some embodiments, a pick-up error alert may be sent to one or more administrators in real-time such that one or more administrators and/or security personnel may investigate the incident.

In an instance the candidate pick-up user is not authenticated, the process proceeds to operation 814. As shown by operation 814, the apparatus 200 includes means, such as processor 202, memory 204, communications hardware 206, user authentication circuitry 212 or the like, for providing one or more pick-up error alerts.

Turning now to FIG. 4B, as shown by operation 414, the apparatus 200 includes means, such as processor 202, memory 204, communications hardware 206, storage locker circuitry 208, or the like, for providing a control signal to a storage locker compartment of a storage locker. In some embodiments, the storage locker circuitry 208 may provide the control signal to the storage locker compartment of the storage locker once the package pick-up indication is received. The provided control signal causes the storage locker compartment to unlock and/or open such that the package may be removed from the storage locker compartment by the pick-up user. The storage locker circuitry 208 may generate and provide a storage locker compartment message to a facility device 112A-112N and/or user device 110A-110N of the pick-up user to depict where the unlocked and assigned storage locker compartment is located relative to the other storage locker compartments and/or other identifying storage locker compartment information (e.g., a storage locker number, row number, etc.). The facility device 112A-112N and/or user device 110A-110N may be then display the information from the storage locker compartment message such that a drop-off user may navigate the storage lockers to find the assigned storage locker compartment.

As shown by operation 416, the apparatus 200 includes means, such as processor 202, memory 204, communications hardware 206, payment circuitry 210, or the like, for updating a package purchase data object. The package purchase data object may be updated with the buyer information (e.g., user identifier and/or buyer account parameters of the buyer) and/or package information (e.g., package purchase price) once the package is picked up from the storage locker. In some embodiments, the package purchase data object is updated as soon as additional information is received.

As shown by operation 418, the apparatus 200 includes means, such as processor 202, memory 204, communications hardware 206, payment circuitry 210, or the like, for transmitting a payment. The payment circuitry 210 may securely facilitate payment to a seller account and/or from a buyer account in response to one or more payment trigger events. In some embodiments, the payment is performed based on the package purchase data object, which may indicate a package purchase price, a destination account, and a withdrawal account. In some embodiments, the payment trigger event is performed based on the package purchase data object, which may indicate a package purchase price, a destination account, a withdrawal account, an intermediary account, etc. The payment circuitry 210 may determine the payment based on the payment trigger event as well as whether the seller was successfully enrolled in the immediately accessible funds program. If the seller is enrolled in the immediately accessible funds program, this may be stored as a user parameter in the associated user profile of the seller. The particular payment trigger events which may cause the payment to be transmitted by the payment circuitry 210 are further discussed in FIGS. 9 and 10.

In some embodiments, a trigger event may be associated with a trigger event type. For example, while the same actions and/or events may cause a trigger event to be determined, conditions and/or other criteria may be evaluated to determine a trigger event type, which may be indicative of which actions to perform.

Figure 9:
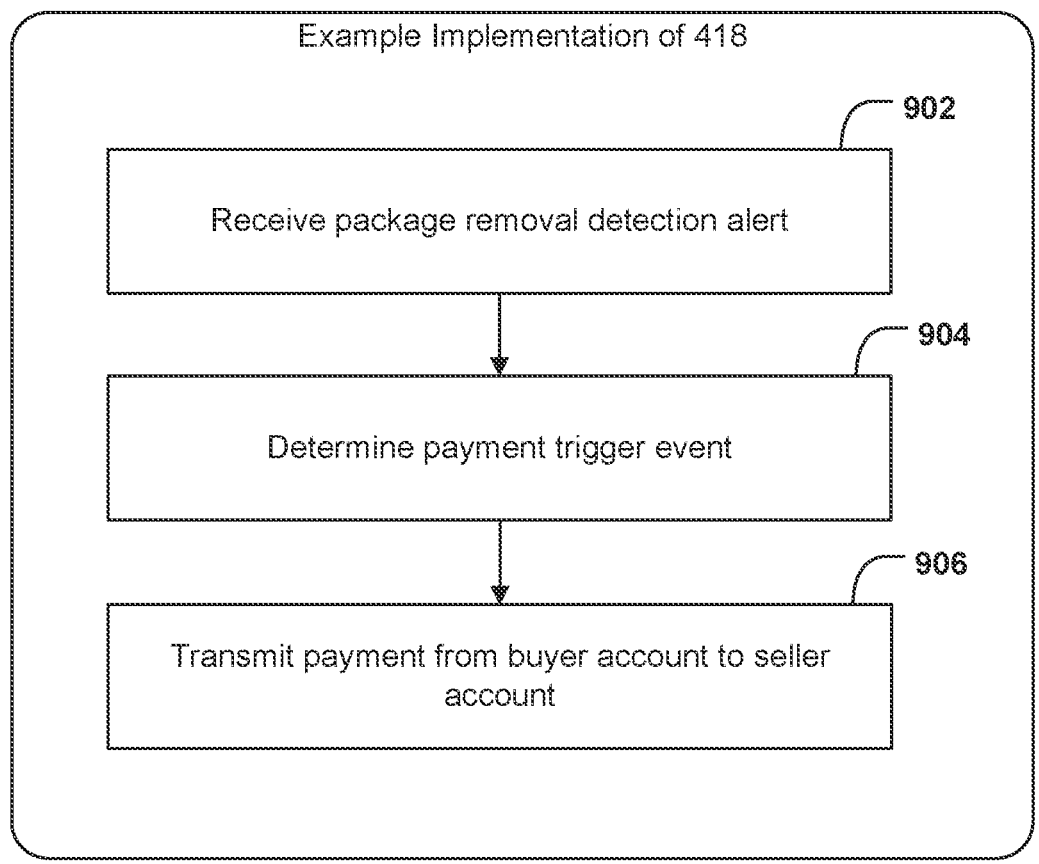
FIG. 9 illustrates an example flowchart for determining a payment trigger event in response to a package removal detection alert, in accordance with some example embodiments described herein.

In some embodiments, operation 418 may be performed in accordance with the operations described by FIG. 9. Turning now to FIG. 9, example operations are shown for transmitting a payment in response to a payment trigger event caused by a package removal detection alert.

As shown by operation 902, the apparatus 200 includes means, such as processor 202, memory 204, communications hardware 206, or the like, for receiving a package removal detection alert. A package removal detection alert may be received in the instance a package is removed from a storage compartment (e.g., as detected by a scale within the storage locker compartment, cameras, and/or other devices). The package removal detection alert may be received from a facility device 112A-112N.

As shown by operation 904, the apparatus 200 includes means, such as processor 202, memory 204, communications hardware 206, payment circuitry 210 or the like, for determining a payment trigger event. Once the payment circuitry 210 has received the package removal detection alert, the payment circuitry 210 may determine this is a trigger event. The payment circuitry 210 may be configured to determine a trigger event automatically in response to one or more events (e.g., receiving a package removal detection alert). In some embodiments, the payment circuitry 210 may be configured to determine a trigger event in response to one or more events and in response to evaluating trigger event criteria, which may further allow payment circuitry to determine a trigger event type. For example, the payment circuitry 210 may determine that a package removal detection alert is a trigger event corresponding to type A in an instance the seller is not enrolled in the immediately accessible funds program.

As shown by operation 906, the apparatus 200 includes means, such as processor 202, memory 204, communications hardware 206, payment circuitry 210 or the like, for transmitting a payment from a buyer account to a seller account. Each trigger event and/or trigger event type may be associated with a defined set of actions and/or operations to be performed in response to determining the trigger event. By way of continuing example, the payment circuitry 210 determine a trigger event in response to package removal detection alert and determined the corresponding seller is not enrolled in the immediately accessible funds program such that the trigger event is a type A trigger event. A type A trigger event may cause the payment circuitry to withdraw funds from a buyer withdrawal account, as described by the package purchase data object, and transfer the funds to a seller destination account, as described by the package purchase data object. In some embodiments, the payment circuitry 210 may also withdraw an agreed upon and accepted fund amount from the withdrawal account of the buyer and/or the destination account of the seller in accordance with various fees associated with the storage locker compartment usage. As such, the seller receives funds from the buyer once the buyer or pick-up user has successfully retrieved the package from the storage locker compartment.

Figure 10:
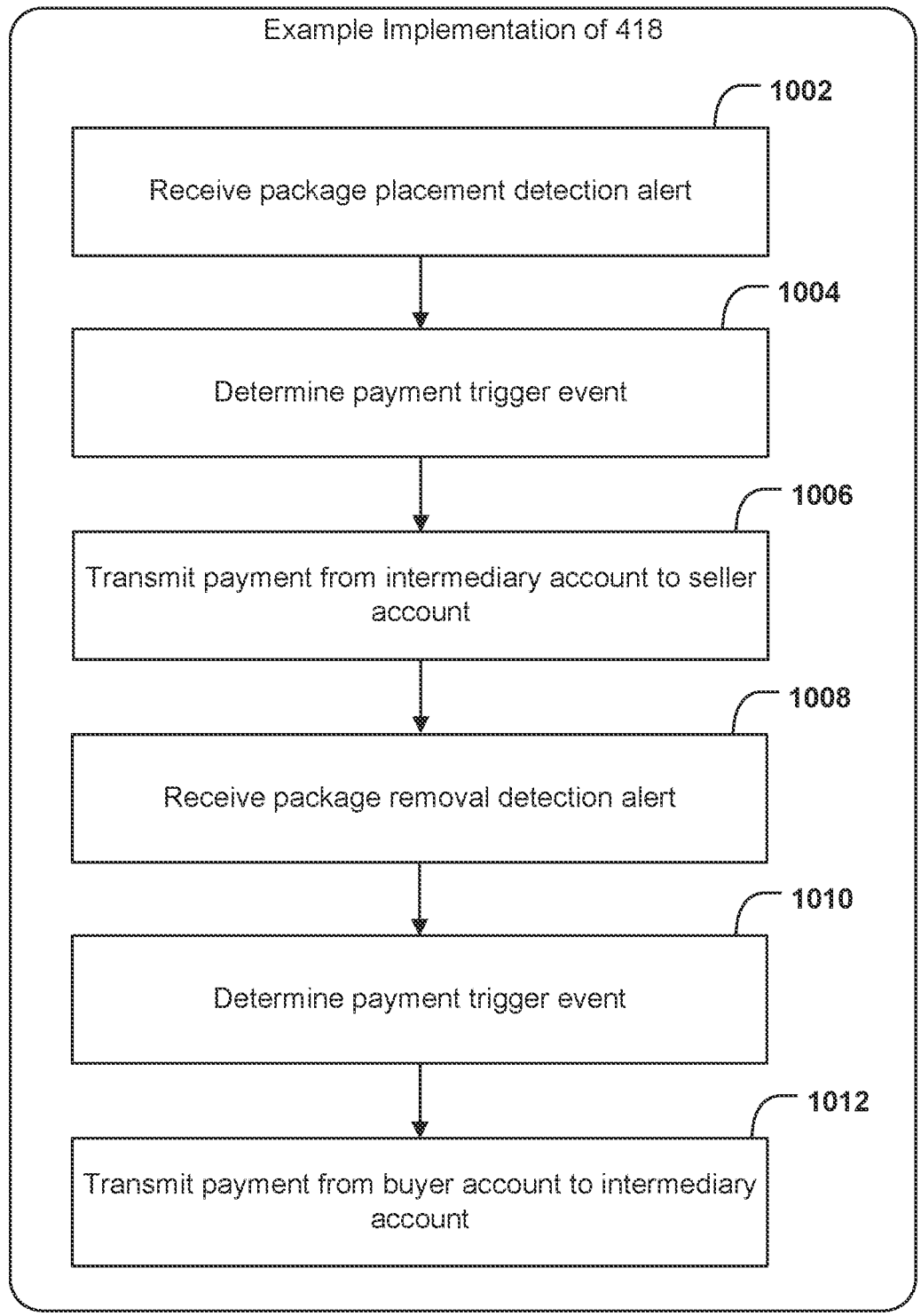
FIG. 10 illustrates an example flowchart for determining a payment trigger event in response to a package placement detection alert, in accordance with some example embodiments described herein.

Alternatively, in some embodiments operation 418 may be performed in accordance with the operations described by FIG. 10. Turning now to FIG. 10, example operations are shown for transmitting a payment in response to a payment trigger event caused by a package placement detection alert.

As shown by operation 1002, the apparatus 200 includes means, such as processor 202, memory 204, communications hardware 206, or the like, for receiving a package placement detection alert. A package placement detection alert may be received in the instance a package is placed into a storage compartment (e.g., as detected by a scale within the storage locker compartment, cameras, and/or other devices). The package placement detection alert may be received from a facility device 112A-112N.

As shown by operation 1004, the apparatus 200 includes means, such as processor 202, memory 204, communications hardware 206, or the like, for determining a payment trigger event. Once the payment circuitry 210 has received the package placement detection alert, the payment circuitry 210 may determine this is a trigger event. The payment circuitry 210 may be configured to determine a trigger event in response to one or more events and in response to evaluating trigger event criteria, which may further allow payment circuitry to determine a trigger event type. For example, the payment circuitry 210 may determine that a package placement detection alert is a trigger event corresponding to type Z in an instance the seller is enrolled in the immediately accessible funds program.

As shown by operation 1006, the apparatus 200 includes means, such as processor 202, memory 204, communications hardware 206, payment circuitry 210 or the like, for transmitting a payment from an intermediary account to a seller account. As described above, each trigger event and/or trigger event type may be associated with a defined set of actions and/or operations to be performed in response to determining the trigger event. By way of continuing example, the payment circuitry 210 determine a trigger event in response to a package placement detection alert and determined the corresponding seller is enrolled in the immediately accessible funds program such that the trigger event is a type Z trigger event. A type Z trigger event may cause the payment circuitry to withdraw funds from an intermediary account, as described by the package purchase data object, and transfer the funds to a seller destination account, as described by the package purchase data object. As such, the seller may receive the agreed-upon amount of funds from an intermediary account as soon as the package is placed within the storage locker compartment.

As shown by operation 1008, the apparatus 200 includes means, such as processor 202, memory 204, communications hardware 206, or the like, for receiving a package removal detection alert. As described above, the package removal detection alert may be received in the instance a package is removed from a storage compartment (e.g., as detected by a scale within the storage locker compartment, cameras, and/or other devices). The package removal detection alert may be received from a facility device 112A-112N.

As shown by operation 1010, the apparatus 200 includes means, such as processor 202, memory 204, communications hardware 206, payment circuitry 210 or the like, for determining a payment trigger event. As described above, in some embodiments, the payment circuitry 210 may be configured to determine a trigger event in response to one or more events and in response to evaluating trigger event criteria, which may further allow payment circuitry to determine a trigger event type. For example, the payment circuitry 210 may determine that a package removal detection alert is a trigger event corresponding to type B in an instance the seller is enrolled in the immediately accessible funds program.

As shown by operation 1012, the apparatus 200 includes means, such as processor 202, memory 204, communications hardware 206, payment circuitry 210 or the like, for transmitting a payment from a buyer account to the intermediary account. As described above, each trigger event and/or trigger event type may be associated with a defined set of actions and/or operations to be performed in response to determining the trigger event. By way of continuing example, the payment circuitry 210 determine a trigger event in response to package removal detection alert and determined the corresponding seller is enrolled in the immediately accessible funds program such that the trigger event is a type B trigger event. A type B trigger event may cause the payment circuitry to withdraw funds from a buyer withdrawal account, as described by the package purchase data object, and transfer the funds to the intermediary account, as described by the package purchase data object. In some embodiments, the payment circuitry 210 may also withdraw an agreed upon and accepted fund amount from the withdrawal account of the buyer and/or the destination account of the seller in accordance with various fees associated with the storage locker compartment usage. As such, the intermediary account receives funds from the buyer once the buyer or pick-up user has successfully retrieved the package from the storage locker compartment and thus has recovered the funds used to transfer payment to the seller in operation 1006.

As described above, example embodiments provide methods and apparatuses that enable the secure transfer of packages between parties. example embodiments described herein advantageously allow for the secure facilitation of package transfer between parties. In particular, example embodiments described herein allow for a seller and a buyer to securely exchange a package without physically meeting. In particular, example embodiments provided herein may employ identity proofing techniques that authenticate drop-off users who are dropping off a package and pick-up users who are picking up a package and only in instances whether the respective user is authenticated, does the storage locker compartment unlock and open for the user. As such, techniques described herein allow for a package to be securely transferred only between authenticated parties, thus preventing fraudsters from stealing the package.

Additionally, example embodiments described herein allow for the evaluation of a package and/or package contents prior to allowing the package to be stored in the storage lockers. Facility devices may be used to capture one or more package attributes, which may be evaluated to generate a package identity confidence score, which is indicative of an inferred confidence that the package and/or package contents are authentic as claimed by the seller. The package and/or package contents may also be evaluated to determine whether they are associated with a stolen item. Advantageously, this allows buyers to purchase a package with confidence that the package and/or package contents are authentic.

Furthermore, example embodiments may allow for the secure and anonymous transfer of funds from the buyer to the seller without either party needing information from the other. In particular, a seller may provide his/her account details using package offer indication and a buyer may provide his/her account details using a buyer identity indication. As such, the buyer and seller may not exchange personal information and/or details other than a package identifier to link the buyer and seller information. In instances where the buyer and seller are known to one another and are trusted, the package offer indication may include buyer details.

Additionally, in some embodiments, the seller may apply to be enrolled in an immediately accessible funds program. The immediately accessible funds program may advantageously provide seller with immediate payment upon deposit of the package in the storage locker compartment of the storage locker using an intermediary account. Upon successful sale and pick-up of the package by the buyer, the funds from the buyer may then be transferred to the intermediary account. As these examples all illustrate, example embodiments contemplated herein provide technical solutions that solve real-world problems faced during package transfer between parties, and particularly for transfer involving online marketplaces.

Example System Interaction

Figure 11A:
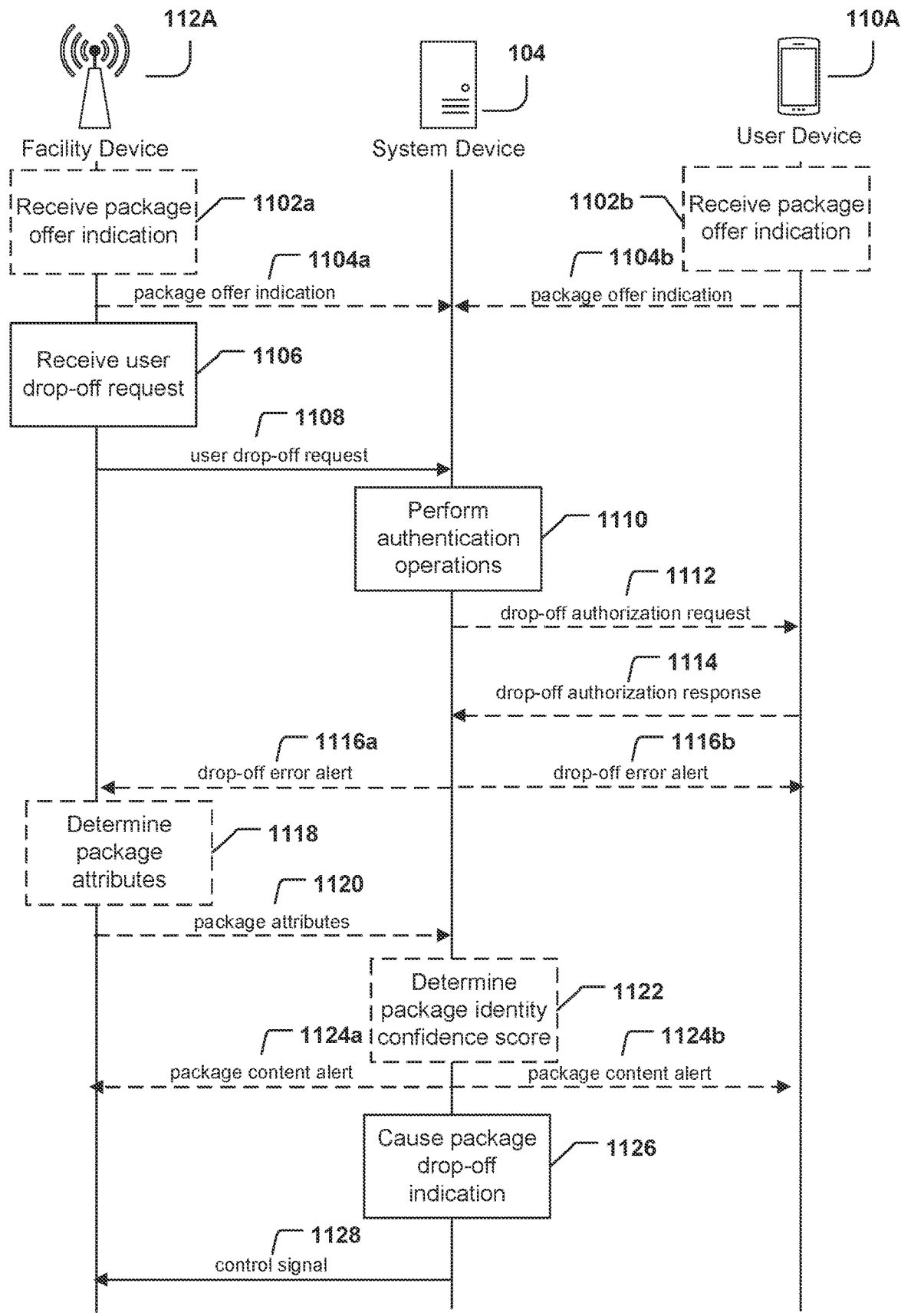
FIGS. 11A, 11B, and 11C illustrate a swim lane diagram with example operations that may be performed by components of the environment depicted in FIG. 1, in accordance with some example embodiments described herein.
Figure 11B:
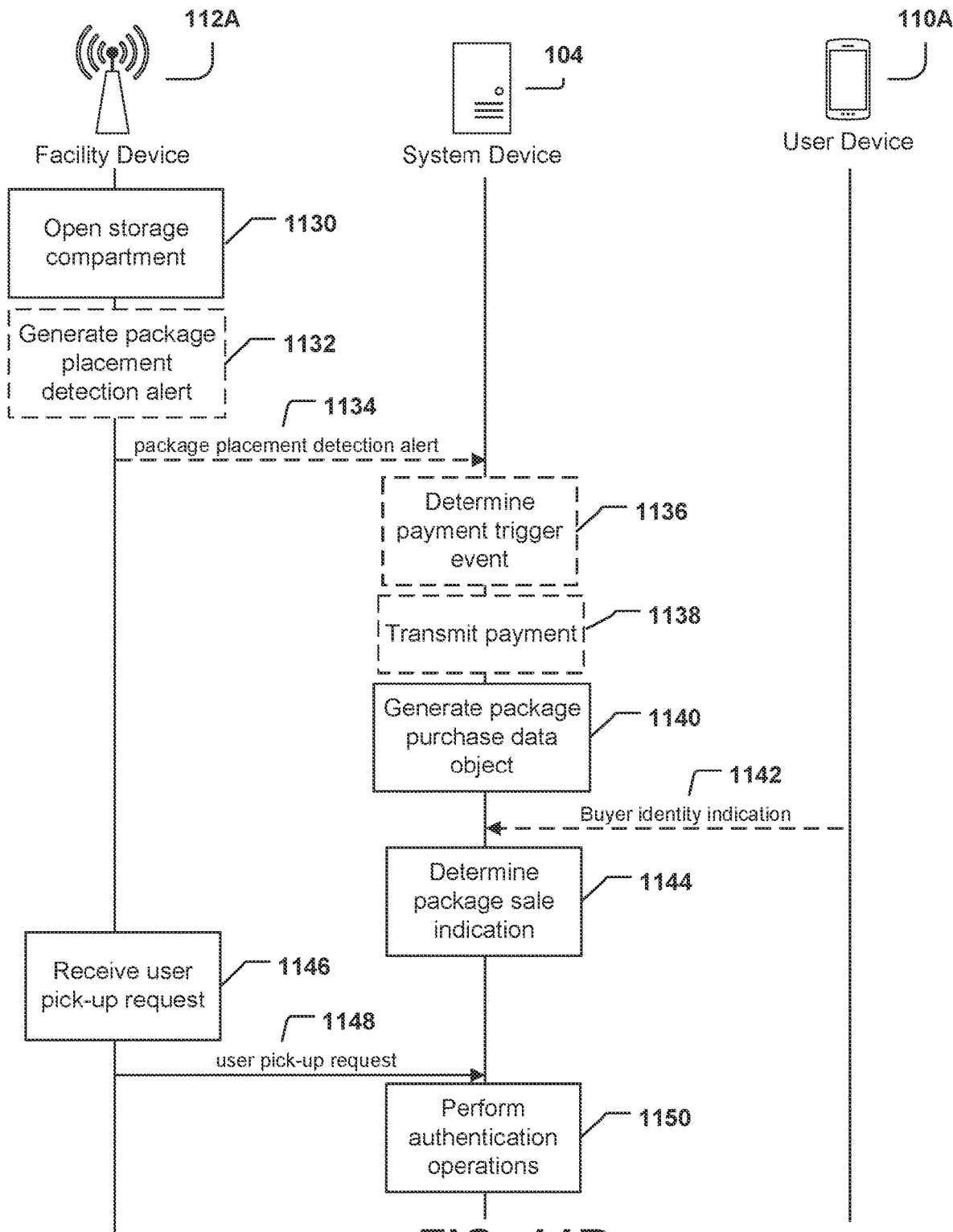
Figure 11C:
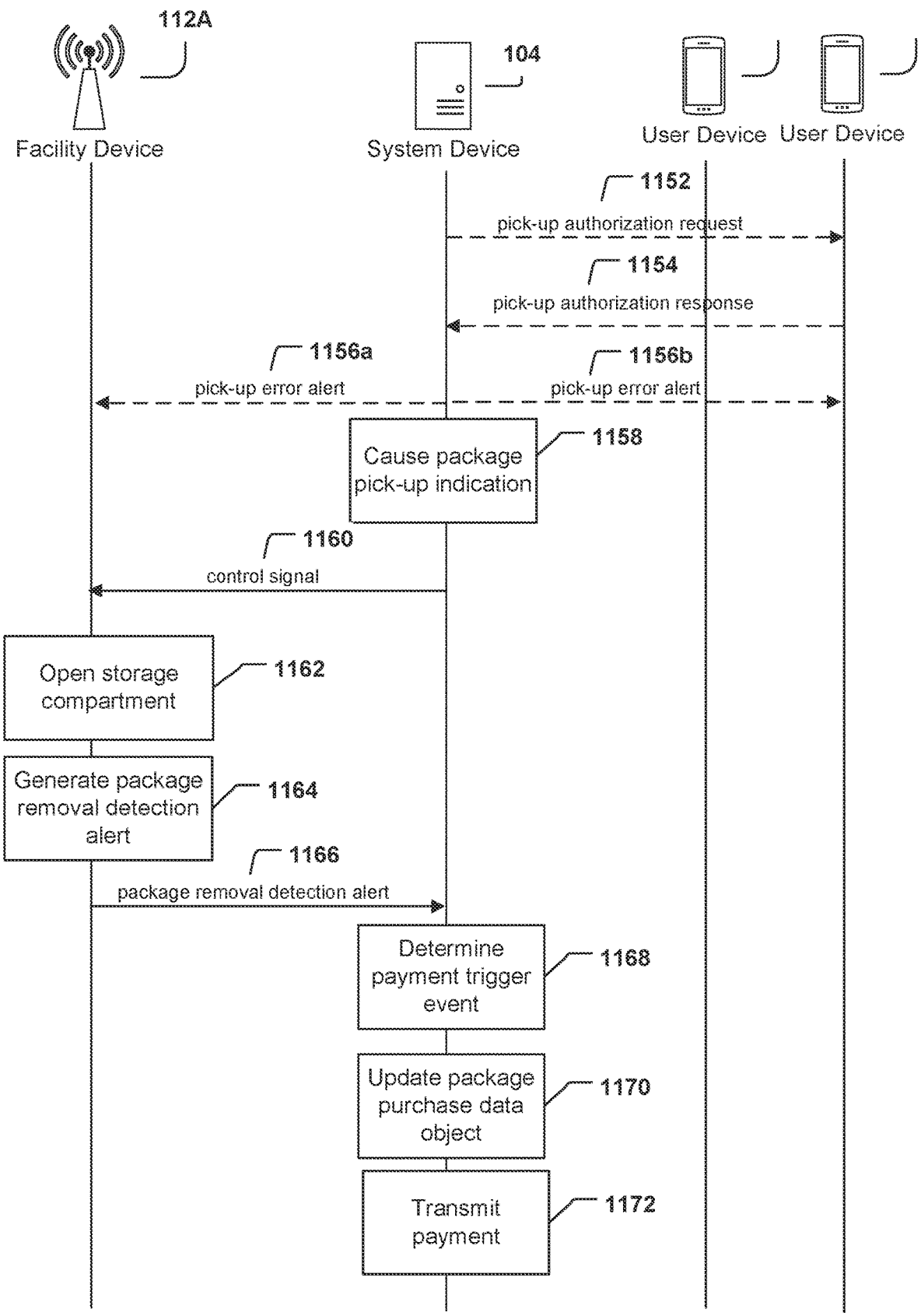

FIGS. 11A-11C show a swim lane diagram illustrating example operations (e.g., as described above in connection with FIGS. 4A-10) performed by components of the environment depicted in FIG. 1 to produce various benefits of the implementations described herein. The operations shown in the swim lane diagram performed by a facility device (e.g., facility device 112A-112N) are shown along the line extending from the box labeled "facility device 112A," operations performed by system device 104 are shown along the line extending from the box labeled "system device 104," operations performed by user device (e.g., user device 110A-110N) are shown along the line extending from the box labeled "user device 110A", and operations performed by another user device (e.g., user device 110A-110N) are shown along the line extending from the box labeled "user device 110B." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 11A-11C.

Turning first to FIG. 11A, at operations 1102a and 1102b, the facility device 112A and/or user device 110A may receive a package offer indication. At operations 1104a and 1104b, the facility device 112A and/or user device 110A may provide the package offer indication to system device 104. At operation 1106, the facility device 112A may receive a user drop-off request. At operation 1108, the facility device 112A may provide the user drop-off request to the system device 104. At operation 1110, system device 104 may perform one or more authentication operations based on the user drop-off request. Optionally, at operation 1112 the system device 104 may provide a drop-off authorization request to a user device 110A, which may be associated with a seller. Optionally, at operation 1114, the user device 110A may provide a drop-off authorization response to the system device 104 in response to seller user input. Optionally, at operation 1116a and 1116b, the system device 104 may provide a drop-off error alert to facility device 112A and/or user device 110A in an instance a candidate drop-off user is not authenticated. Optionally, at operation 1118, facility device 112A may determine one or more package attributes. Optionally, at operation 1120 the facility device 112A may provide the one or more package attributes to system device 104. Optionally, at operation 1122 the system device 104 may determine a package identity confidence score. Optionally, at operation 1124a and 1124b, the system device 104 may provide a package content alert to facility device 112A and/or user device 110A in an instance a package identity confidence score does not satisfy one or more package identity confidence score thresholds. At operation 1126, the system device 104 may cause a package drop-off indication. At operation 1128, the system device 104 may provide a control signal to facility device 112A.

Turning now to FIG. 11B, at operation 1130, the facility device may unlock and/or open a storage compartment in response to the control signal provided by the system device 104. Optionally, at operation 1132, the facility device 112A may generate a package placement detection alert. Optionally, at operation 1134, the facility device 112A may provide the package placement detection alert to the system device 104. Optionally, at operation 1136, the system device 104 may determine a payment trigger event in response to the package placement detection alert. Optionally, at operation 1138, the system device 104 may transmit a payment in response to the payment trigger event. At operation 1140, the system device 104 may generate a package purchase data object. Optionally, at operation 1142, the user device 110A may provide a buyer identity indication to system device 104. At operation 1144, the system device 104 may determine a package sale indication. At operation 1146, the facility device 112A may receive a user pick-up request. At operation 1148, the facility device 112A may provide the user pick-up request to the system device 104. At operation 1150, the system device 104 may perform one or more authentication operations based on the user pick-up request.

Turning now to FIG. 11C, optionally, at operation 1152 the system device 104 may provide a pick-up authorization request to a user device 110B, which may be associated with a buyer. Optionally, at operation 1154, the user device 110B may provide a pick-up authorization response to the system device 104 in response to buyer user input. Optionally, at operation 1156a and 1156b, the system device 104 may provide a pick-up error alert to facility device 112A and/or user device 110B in an instance a candidate pick-up user is not authenticated. At operation 1158, the system device 104 may cause a package pick-up indication. At operation 1160, the system device 104 may provide a control signal to facility device 112A. At operation 1162, the facility device 11A may unlock and/or open the storage compartment storing the package.

Optionally, at operation 1164, the facility device 112A may generate a package removal detection alert. Optionally, at operation 1166, the facility device 112A may provide the package removal detection alert to system device 104. Optionally, at operation 1168, the system device 104 may determine a payment trigger event in response to the package removal detection alert. At operation 1170, the system device 104 may update the package purchase data object. At operation 1172, the system device 104 may transmit a payment in response to the payment trigger event.

FIGS. 4A, 4B, 5, 6, 7, 8, 9, 10, 11A, 11B, and 11C illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations described above in connection with FIGS. 4A-11C may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for securely facilitating a package transfer between parties, the method comprising:
    receiving, by communications hardware, a package offer indication, wherein the package offer indication comprises a package identifier and a user identifier associated with a seller;
    performing, by user authentication circuitry and based on a drop-off user identifier, an authentication operation to authenticate a candidate drop-off user;
    in response to successfully authenticating the candidate drop-off user, unlocking, by storage locker circuitry, a compartment of a storage locker;
    generating, by payment circuitry, a package purchase data object based on the package offer indication;
    determining, by the payment circuitry, a package sale indication associated with the package offer indication, wherein the package sale indication comprises a package purchase price and a user identifier associated with a buyer;
    performing, by the user authentication circuitry and based on a pick-up user identifier, an authentication operation to authenticate a candidate pick-up user;
    in response to successfully authenticating the candidate pick-up user, unlocking, by the storage locker circuitry, the compartment of the storage locker;
    updating, by the payment circuitry, the package purchase data object based on the package sale indication; and
    transmitting, by the payment circuitry and in response to a payment trigger event, a payment to a seller account based on the package purchase data object.

2. The method of claim 1, wherein the package offer indication further comprises the package purchase price and the user identifier associated with the seller, wherein determining the package sale indication is based on the package offer indication.

3. The method of claim 1, further comprising receiving, by the communications hardware, a buyer identity indication, wherein (a) the buyer identity indication comprises the package purchase price and the user identifier associated with the buyer and (b) determining the package sale indication is based on the buyer identity indication.

4. The method of claim 1, further receiving, by the communications hardware, a package removal detection alert from a facility device, wherein (a) the package removal detection alert is received in response to a package being removed from the compartment of the storage locker and (b) the package removal detection alert causes detection of a payment trigger event.

5. The method of claim 1, further comprising:
    receiving, by the communications hardware, a package placement detection alert from a facility device, wherein (a) the package placement detection alert is received in response to a package being placed in the compartment of the storage locker and (b) the package placement detection alert causes detection of the payment trigger event.

6. The method of claim 1, wherein the payment to the seller account is from an intermediary account.

7. The method of claim 6, further comprising in response to receiving a package removal detection alert, transmitting, by the payment circuitry, a payment to the intermediary account based on the package purchase data object.

8. The method of claim 1, further comprising:
    receiving, by the communications hardware, a package attribute for a package;
    determining, by package authentication circuitry, a package identity confidence score for the package based on the package offer indication and the package attribute; and
    determining, by the package authentication circuitry, whether the package identity confidence score satisfies a package identity confidence score threshold, wherein the package purchase data object is generated in response to the package identity confidence score satisfying the one or more-package identity confidence score threshold.

9. The method of claim 8, further comprising:
    in response to the package identity confidence score failing to satisfy the package identity confidence score threshold, generating, by the package authentication circuitry, a package content alert; and
    providing, by the communications hardware, the package content alert to at least one of a user device of the seller, a user device of a drop-off user, and a facility device.

10. The method of claim 1, further comprising:
    receiving, by the communications hardware, a package attribute for a package;
    selecting, by the storage locker circuitry, the compartment of the storage locker based on the package attribute.

11. The method of claim 1, wherein performing the authentication operation to authenticate the candidate drop-off user comprises:
    determining, by the user authentication circuitry, whether the candidate drop-off user is associated with permission to perform a drop-off activity;
    in response to determining the candidate drop-off user is associated with permission to perform the drop-off activity, generating, by the user authentication circuitry, a user identification confidence score for the candidate drop-off user, wherein (a) the user identification confidence score for the candidate drop-off user is based on a comparison between a captured user parameter of the candidate drop-off user and a stored user parameter associated with the drop-off user identifier; and determining, by the user authentication circuitry, whether the user identification confidence score for the candidate drop-off user satisfies a user identification confidence score threshold, wherein the candidate drop-off user is successfully authenticated in response to determining the user identification confidence score for the candidate drop-off user satisfies the user identification confidence score threshold.

12. The method of claim 11, further comprising:
in response to determining the user identification confidence score for the candidate drop-off user does not satisfy the user identification confidence score threshold, providing, by the communications hardware, a drop-off error alert to a user device of the seller, wherein the drop-off error alert indicates that the candidate drop-off user could not be authenticated.

13. The method of claim 1, wherein performing the authentication operation to authenticate the candidate pick-up user comprises:
determining, by the user authentication circuitry, whether the candidate pick-up user is associated with permission to perform a pick-up activity;
in response to determining the candidate pick-up user is associated with permission to perform the pick-up activity, generating, by the user authentication circuitry, a user identification confidence score for the candidate pick-up user, wherein (a) the user identification confidence score for the candidate pick-up user is based on a comparison between a captured user parameter of the candidate pick-up user and a stored user parameter associated with the pick-up user identifier; and
determining, by the user authentication circuitry, whether the user identification confidence score for the candidate pick-up user satisfies a user identification confidence score threshold, wherein the candidate drop-off user is successfully authenticated in response to determining the user identification confidence score for the candidate pick-up user satisfies the user identification confidence score threshold.

14. The method of claim 13, further comprising:
in response to determining the user identification confidence score for the candidate pick-up user does not satisfy the user identification confidence score threshold, providing, by the communications hardware, a pick-up error alert to a user device of the buyer, wherein the pick-up error alert indicates that the candidate pick-up user could not be authenticated.

15. The method of claim 1, wherein the drop-off user identifier uniquely identifies the seller.

16. The method of claim 1, wherein the pick-up user identifier uniquely identifies the buyer.

17. An apparatus for securely facilitating a package transfer between parties, the apparatus comprising:
communications hardware configured to receive a package offer indication, wherein the package offer indication comprises a package identifier and a user identifier associated with a seller;
user authentication circuitry configured to perform, based on a drop-off user identifier, an authentication operation to authenticate a candidate drop-off user;
storage locker circuitry configured to, in response to successfully authenticating the candidate drop-off user, unlock a compartment of a storage locker; and payment circuitry configured to:
generate a package purchase data object based on the package offer indication, and
determine a package sale indication associated with the package offer indication, wherein the package sale indication comprises a package purchase price and a user identifier associated with a buyer,
wherein the user authentication circuitry is further configured to perform, based on a pick-up user identifier, an authentication operation to authenticate a candidate pick-up user;
wherein the storage locker circuitry is further configured to, in response to successfully authenticating the candidate pick-up user, unlock the compartment of the storage locker;
wherein the payment circuitry is further configured to update the package purchase data object based on the package sale indication,
wherein the payment circuitry is further configured to transmit, in response to a payment trigger event, a payment to a seller account based on the package purchase data object.

18. The apparatus of claim 17, wherein the communications hardware is further configured to receive a package removal detection alert from a facility device, wherein (a) the package removal detection alert is received in response to a package being removed from the compartment of the storage locker and (b) the package removal detection alert causes detection of a payment trigger event.

19. The apparatus of claim 17, wherein the communications hardware is further configured to receive a package placement detection alert from a facility device, wherein (a) the package placement detection alert is received in response to a package being placed in the compartment of the storage locker and (b) the package placement detection alert causes detection of a payment trigger event.

20. A computer program product for securely facilitating a package transfer between parties, the computer program product comprising at least one non-transitory computer-readable storage medium storing software instructions that, when executed, cause an apparatus to:
receive a package offer indication, wherein the package offer indication comprises a package identifier and a user identifier associated with a seller;
perform, based on a drop-off user identifier, an authentication operation to authenticate a candidate drop-off user;
in response to successfully authenticating the candidate drop-off user, unlock a compartment of a storage locker;
generate a package purchase data object based on the package offer indication;
determine a package sale indication associated with the package offer indication, wherein the package sale indication comprises a package purchase price and a user identifier associated with a buyer;
perform, based on a pick-up user identifier, an authentication operation to authenticate a candidate pick-up user;
in response to successfully authenticating the candidate pick-up user, unlock the compartment of the storage locker;
update the package purchase data object based on the package sale indication; and transmit, in response to a payment trigger event, a payment to a seller account based on the package purchase data object.

\* \* \* \* \*

UNITED STATES PATENT AND TRADEMARK OFFICE
CERTIFICATE OF CORRECTION

PATENT NO. : 12,475,493 B1  
APPLICATION NO. : 18/166785  
DATED : November 18, 2025  
INVENTOR(S) : Matthew N. Wheeler et al.

Page 1 of 1

It is certified that error appears in the above-identified patent and that said Letters Patent is hereby corrected as shown below:

In the Claims

In Column 38, Line 42 (Claim 8), please delete "one or more".

Signed and Sealed this  
Thirtieth Day of December, 2025

John A. Squires  
*Director of the United States Patent and Trademark Office*